United States Patent
Fujita

(10) Patent No.: US 10,964,217 B2
(45) Date of Patent: Mar. 30, 2021

(54) TRAVEL CONTROL METHOD AND TRAVEL CONTROL APPARATUS

(71) Applicant: Nissan Motor Co., Ltd., Yokohama (JP)

(72) Inventor: Susumu Fujita, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 15/763,350

(22) PCT Filed: Sep. 30, 2015

(86) PCT No.: PCT/JP2015/077783
§ 371 (c)(1),
(2) Date: Mar. 26, 2018

(87) PCT Pub. No.: WO2017/056247
PCT Pub. Date: Apr. 6, 2017

(65) Prior Publication Data
US 2018/0286247 A1    Oct. 4, 2018

(51) Int. Cl.
| | | |
|---|---|---|
| G08G 1/16 | (2006.01) | |
| B60W 10/20 | (2006.01) | |
| G08G 1/056 | (2006.01) | |
| B60W 10/04 | (2006.01) | |

(Continued)

(52) U.S. Cl.
CPC ............ *G08G 1/166* (2013.01); *B60W 10/04* (2013.01); *B60W 10/18* (2013.01); *B60W 10/20* (2013.01); *G05D 1/0246* (2013.01); *G08G 1/056* (2013.01); *G08G 1/163* (2013.01); *G08G 1/167* (2013.01); *B60W 2420/42* (2013.01); *B60W 2420/62* (2013.01); *B60W 2552/00* (2020.02); *B60W 2554/80* (2020.02); *B60W 2710/18* (2013.01); *B60W 2710/20* (2013.01); *B60W 2720/10* (2013.01); *G05D 2201/0213* (2013.01)

(58) Field of Classification Search
CPC ...... B60W 10/04; B60W 10/18; B60W 10/20; B60W 2420/42; B60W 2420/62; B60W 10/62; B60W 2550/14; B60W 2550/30; B60W 2710/18; B60W 2710/20; B60W 2720/10; G05D 1/0246; G05D 2201/0213; G08G 1/056; G08G 1/163; G08G 1/166; G08G 1/167
See application file for complete search history.

(56) References Cited

U.S. PATENT DOCUMENTS 6,265,991 B1 * 7/2001 Nishiwaki ............. G08G 1/165
                                                   340/903

FOREIGN PATENT DOCUMENTS

| DE | 102008036131 A1 | 3/2009 |
|---|---|---|
| JP | H09243389 A | 9/1997 |
| JP | 2005-004442 A | 1/2005 |

(Continued)

*Primary Examiner* — Charles J Han
(74) *Attorney, Agent, or Firm* — Young Basile Hanlon & MacFarlane, P.C.

(57) ABSTRACT

A travel control method estimates a position of a moving object around a subject vehicle using a detector configured to detect the moving object. This method includes detecting a direction of travel in a lane from map information. The lane is located on a road on which the moving object travels. When the subject vehicle is changing directions, the position of the moving object is estimated on the basis of the direction of travel in the lane.

4 Claims, 15 Drawing Sheets

(51) Int. Cl.
*B60W 10/18* (2012.01)
*G05D 1/02* (2020.01)

(56) References Cited

FOREIGN PATENT DOCUMENTS

| | | | |
|---|---|---|---|
| JP | 2005-257314 A | | 9/2005 |
| JP | 2005-267120 A | | 9/2005 |
| JP | 2005267120 A | * | 9/2005 |
| JP | 2009-042167 A | | 2/2009 |
| JP | 2012-014219 A | | 1/2012 |
| JP | 2012014219 A | * | 1/2012 |
| JP | 2013-134567 A | | 7/2013 |

* cited by examiner

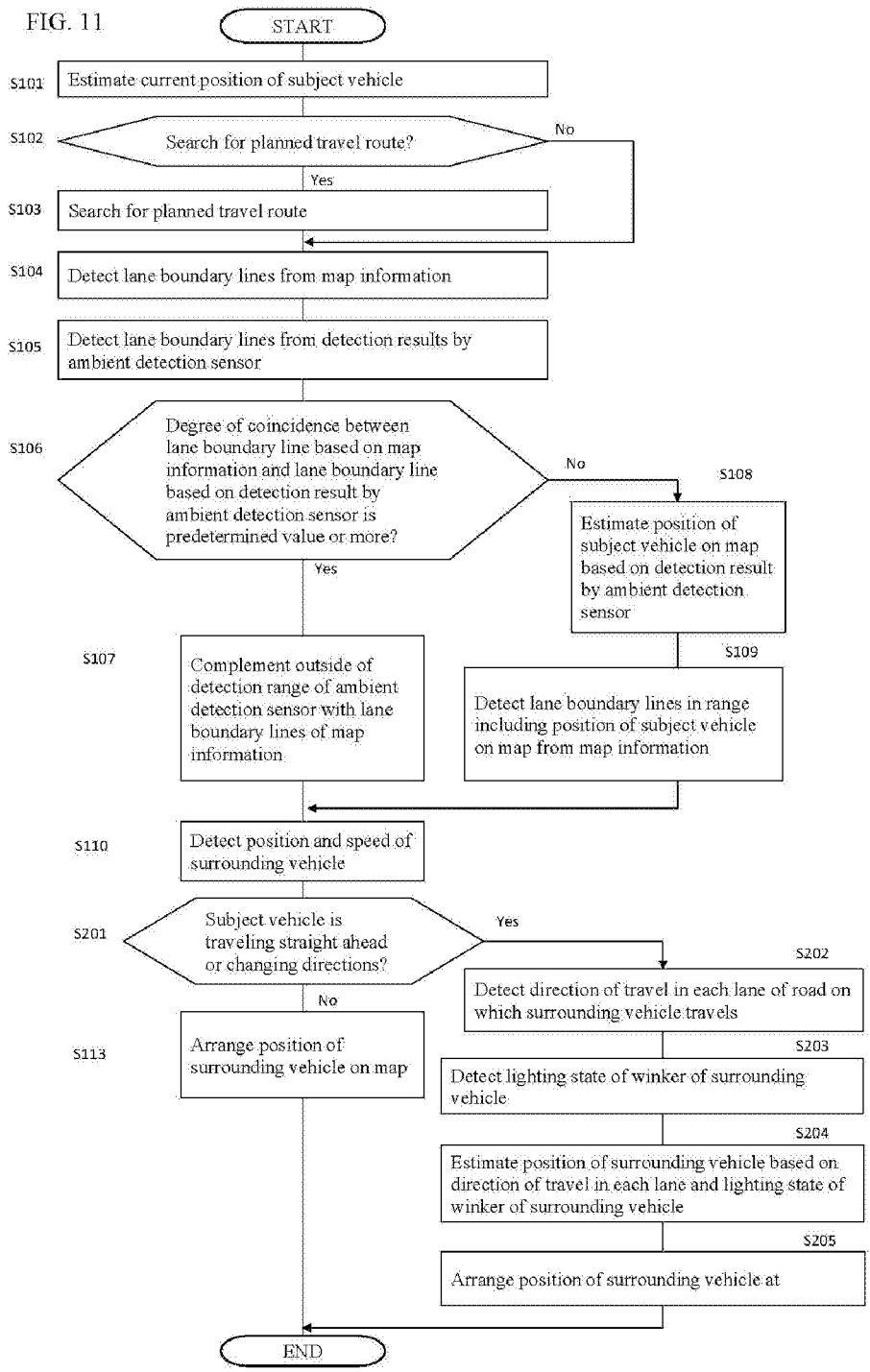

TRAVEL CONTROL METHOD AND TRAVEL CONTROL APPARATUS

TECHNICAL FIELD

The present invention relates to a travel control method and a travel control apparatus for controlling travel of a vehicle.

BACKGROUND

There has been a conventional technique of determining whether or not another vehicle is traveling in a lane (adjacent lane) adjacent to a lane (subject vehicle lane) in which a subject vehicle travels, on the basis of the number of lanes included in map information and the position of the other vehicle received from the other vehicle (see Japanese Patent Application JP2013-134567A).

However, unfortunately, the position of another vehicle cannot be detected with a high degree of accuracy depending on the sensor provided in the other vehicle, and the other vehicle may be actually traveling in the adjacent lane even when a determination is made that the other vehicle is not traveling in the adjacent lane.

SUMMARY

A problem to be solved by the present invention is to provide a travel control method that can appropriately estimate the position of a moving object existing around the subject vehicle.

The present invention solves the above problem by estimating the position of a moving object on the basis of the direction of travel in a lane of a road on which the moving object travels when the subject vehicle is changing directions or turning.

According to the present invention, the position of the moving object existing around the subject vehicle can be appropriately estimated.

BRIEF DESCRIPTION OF THE DRAWINGS

FIG. 11 is a flowchart illustrating a travel control process according to a second embodiment;

DETAILED DESCRIPTION OF THE EMBODIMENTS

Hereinafter, one or more embodiments of the present invention will be described with reference to the drawings. In the embodiments, a travel control apparatus equipped in a vehicle will be exemplified and described.

First Embodiment

Figure 1:
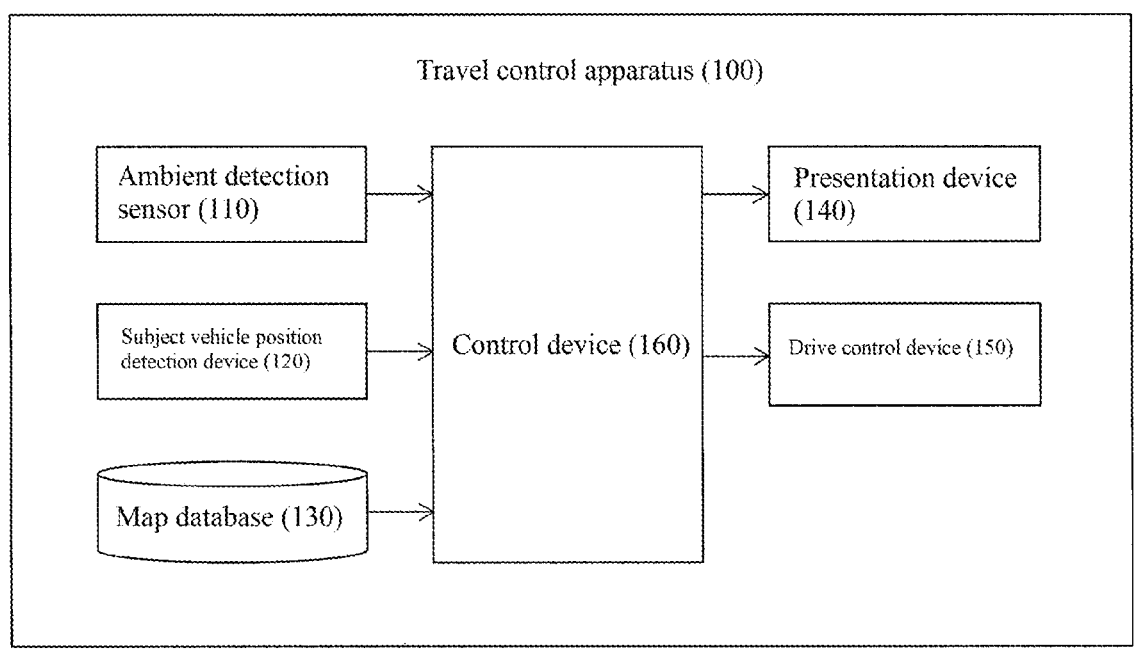
FIG. 1 is a block diagram illustrating the configuration of a travel control apparatus according to one or more embodiments of the present invention.

FIG. 1 is a block diagram illustrating the configuration of a travel control apparatus 100 according to the present embodiment. As illustrated in FIG. 1, the travel control apparatus 100 according to the present embodiment includes an ambient detection sensor 110, a subject vehicle position detection device 120, a map database 130, a presentation device 140, a drive control device 150, and a control device 160. These devices are connected to one another via a controller area network (CAN) or other in-vehicle LAN for mutually exchanging information.

The ambient detection sensor 110 detects obstacles (such as other vehicles) and road markers (such as lane marks and curbstones) existing around the subject vehicle. Examples of the ambient detection sensor 110 include a front camera that captures images ahead of the subject vehicle, a rear camera that captures images behind the subject vehicle, and side cameras that capture images at sides of the subject vehicle. A laser range finder (LRF) that detects obstacles around the subject vehicle can also be used as the ambient detection sensor 110. The ambient detection sensor 110 may be configured using one sensor of the above-described sensors or may also be configured using a combination of two or more sensors. The detection results by the ambient detection sensor 110 are output to the control device 160.

The subject vehicle position detection device 120 is composed of a GPS unit, a gyro-sensor, a vehicle speed sensor, and other necessary components. The subject vehicle position detection device 120 detects radio waves transmitted from a plurality of communication satellites using the GPS unit to periodically acquire positional information of a target vehicle (subject vehicle) and detects the current position of the target vehicle on the basis of the acquired positional information of the target vehicle, angle variation information acquired from the gyro-sensor, and the vehicle speed acquired from the vehicle speed sensor. The positional information of the target vehicle detected by the subject vehicle position detection device 120 is output to the control device 160.

The map database 130 stores map information that includes road information. The road information includes information on the number of lanes of each road, lane boundary lines that define the lanes, and directions of travel in the lanes. Examples of the directions of travel in lanes include directions of "traveling straight ahead," "turning right," "turning left," "traveling straight ahead and turning right," and "traveling straight ahead and turning left." In the present embodiment, the map database 130 stores information on nodes and links corresponding to lanes, from which the number of lanes and the directions of travel in the lanes can be perceived (details will be described later).

The presentation device 140 may be, for example, a device such as a display of a navigation device, a display incorporated in a rearview mirror, a display incorporated in a meter unit, a head-up display projected on a windshield, and a speaker of an audio device.

The drive control device 150 controls travel of the subject vehicle. For example, when the subject vehicle follows a preceding vehicle, the drive control device 150 controls the operation of a drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve the acceleration, deceleration and vehicle speed so that the distance between the subject vehicle and the preceding vehicle can be maintained at a constant distance. When the subject vehicle changes lanes or turns right or left at an intersection, the drive control device 150 controls the operation of a steering actuator to control the operation of wheels and thereby executes the control of direction change of the subject vehicle. The drive control device 150 controls travel of the subject vehicle in accordance with commands sent from the control device 160, which will be described below. Other well-known methods can also be used as a travel control method by the drive control device 150.

The control device 160 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), digital signal processor (DSP), application specific integrated circuit (ASIC), field programmable gate array (FPGA), or the like can also be used as an operating circuit.

The control device 160 executes the programs stored in the ROM using the CPU thereby to achieve the following various functions: a route search function of searching for a planned travel route of the subject vehicle; a first boundary line detection function of detecting boundary lines of a lane in which the subject vehicle travels (subject vehicle lane) on the basis of the map information; a second boundary line detection function of detecting boundary lines of the subject vehicle lane on the basis of the detection results by the ambient detection sensor 110; a boundary line integration function of integrating the lane boundary lines detected based on the map information and the lane boundary lines detected based on the detection results by the ambient detection sensor 110; a surrounding vehicle detection function of detecting surrounding vehicles; a travel direction determination function of determining whether or not the direction of travel in a lane coincides with the traveling direction of a surrounding vehicle; and a surrounding vehicle relocation function of estimating a lane in which the surrounding vehicle travels and arranging the position of the surrounding vehicle in an appropriate lane on the map. Each function of the control device 190 will be described below.

The control device 160 uses the route search function to generate a planned travel route of the subject vehicle from the current position and destination of the subject vehicle. For example, the route search function can serve to acquire the position of the subject vehicle from the subject vehicle position detection device 120 and acquire the destination, which the driver input, from an input device (not illustrated).

The route search function can also serve to search for the planned travel route using a method known in the art.

Figure 2:
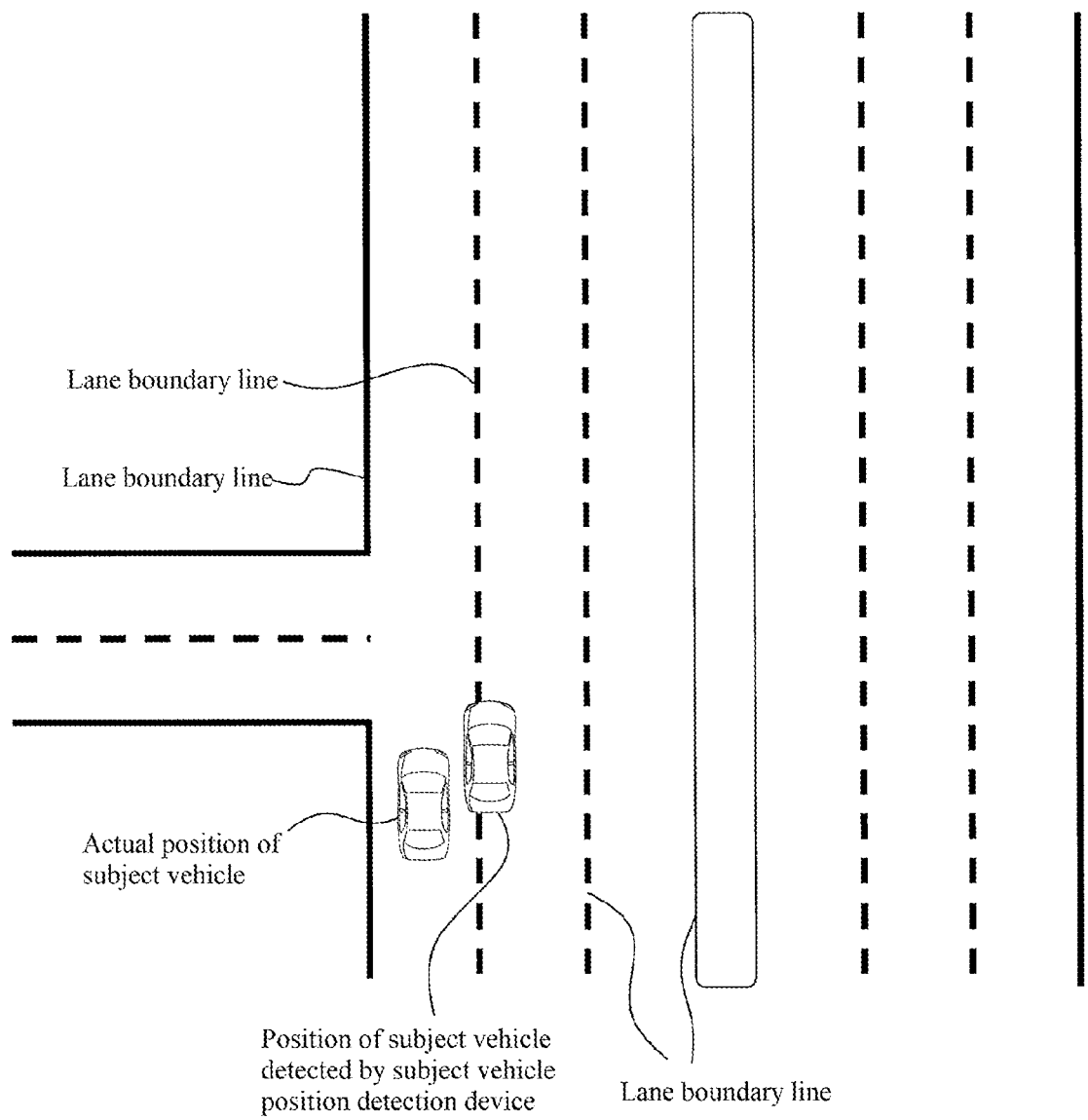
FIG. 2 is a view for describing lane boundary lines.

The control device 160 uses the first boundary line detection function to detect lane boundary lines of lanes including the subject vehicle lane on the basis of the map information stored in the map database 130. The lane boundary lines refer to lines that define boundaries between lanes and adjacent lanes or boundaries between lanes and road shoulders, such as lane marks (solid lines, double lines, broken lines and other lines drawn with white, yellow or the like on a road to define lanes) and curbstones. The map information stored in the map database 130 includes information on the boundary lines of each lane, and the first boundary line detection function serves to refer to the map information to detect the lane boundary lines of lanes including the subject vehicle lane from the map information. As illustrated in FIG. 2, the lane boundary lines detected using the first boundary line detection function are not limited to the lanes around the subject vehicle, and the first boundary line detection function can also serve to detect lane boundary lines of lanes, for example, on the planned travel route of the subject vehicle.

The control device 160 uses the second boundary line detection function to detect lane boundary lines of lanes around the subject vehicle on the basis of the detection results by the ambient detection sensor 110. For example, the second boundary line detection function can serve to detect the lane boundary lines of lanes around the subject vehicle through capturing images of lane marks and curbstones existing around the subject vehicle using the front camera, side cameras or rear camera and analyzing the captured images. In addition or alternatively, the second boundary line detection function can serve to detect the lane boundary lines of lanes around the subject vehicle through detecting the brightness of the road surface and lane marks around the subject vehicle using a laser range finder or detecting protrusions of curbstones by distance measurement.

On general roads that include many curves and intersections, it is difficult to estimate the directions in which lane marks and curbstones exist, and the resolution of the cameras is limited. The range in which the cameras can detect the lane marks and curbstones with a high degree of accuracy is therefore a range of about several tens of meters from the cameras. A laser range finder can also be used to identify the lane marks and curbstones. In this case, however, the laser range finder has to be installed downward in order to detect the brightness of the lane marks drawn on the road surface and detect small protrusions of curbstones. Accordingly, also in the case of using a laser range finder, the range in which the laser range finder can detect the lane marks and curbstones with a high degree of accuracy is a range of about several tens of meters from the laser range finder. Thus, as illustrated in FIG. 2, the range in which the second boundary line detection function can serve to detect the lane boundary lines is a range of about several tens of meters from the subject vehicle, that is, a range around the subject vehicle.

Figure 3:
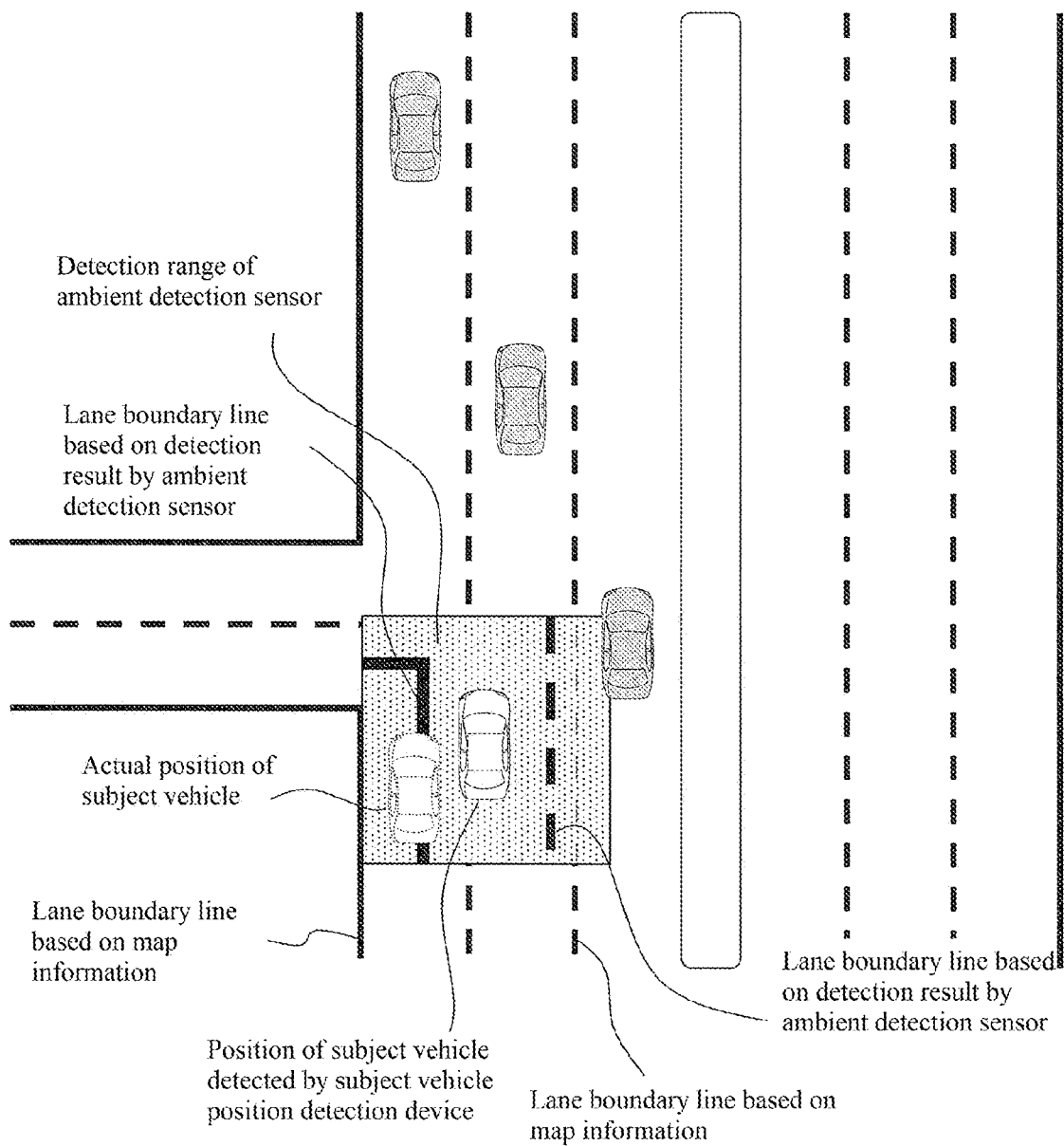
FIG. 3 is a view for describing the detection range of an ambient detection sensor.

The control device 160 uses the boundary line integration function to integrate the lane boundary lines detected using the first boundary line detection function and the lane boundary lines detected using the second boundary line detection function to generate lane boundary lines of lanes including the lane in which the subject vehicle travels. Here, as illustrated in FIG. 3, the range in which the second boundary line detection function can serve to detect the lane boundary lines with a high degree of accuracy is a range around the subject vehicle, and as the distance from the subject vehicle increases, the accuracy in detection of the lane boundary lines lowers. In the present embodiment, therefore, the outside of the range in which the second boundary line detection function can serve to detect the lane boundary lines is complemented with the lane boundary lines detected by the first boundary line detection function.

However, unfortunately, the detection error of the position of the subject vehicle due to the subject vehicle position detection device 120 may cause an error, as illustrated in FIG. 2, between the actual position of the subject vehicle (indicated by broken lines in the figure) and the position of the subject vehicle (indicated by solid lines in the figure) based on the detection result by the subject vehicle position detection device 120. In this case, as illustrated in FIG. 3, shifts occur between the lane boundary lines around the position of the subject vehicle on the map and the lane boundary lines around the subject vehicle based on the detection results by the ambient detection sensor 110. As illustrated in FIG. 3, therefore, lane boundary lines adapted to the actual lane boundary lines cannot be generated merely by integrating the outside of the range, in which the second boundary line detection function can serve to detect the lane boundary lines, with the lane boundary lines detected using the first boundary line detection function.

Figure 4:
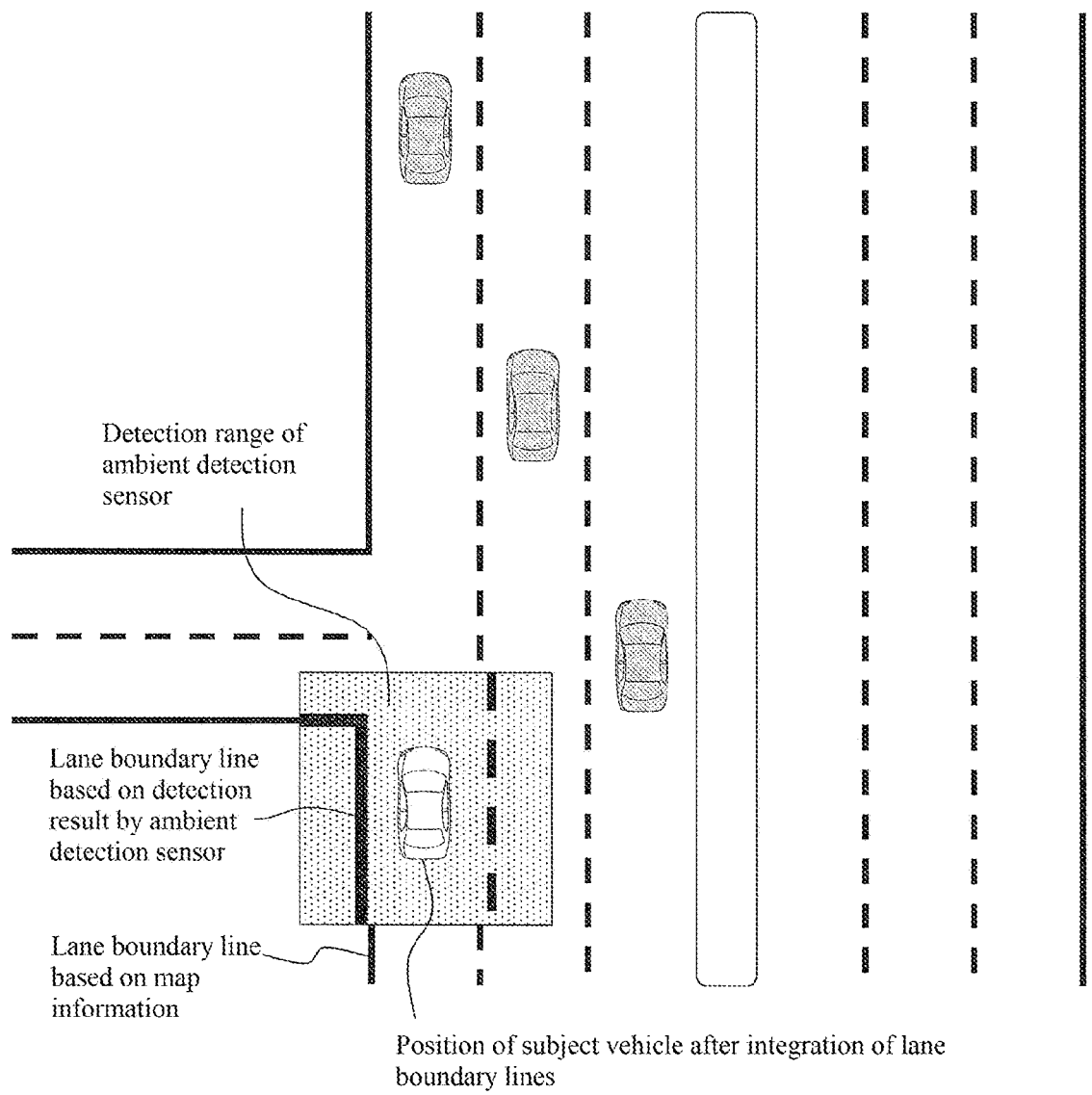
FIG. 4 is a view for describing a method of integrating lane boundary lines.

The boundary line integration function therefore serves to complement the lane boundary lines detected by the ambient detection sensor 110 with the lane boundary lines based on the map information so that, as illustrated in FIG. 4, the lane boundary lines detected by the ambient detection sensor 110 coincide with the lane boundary lines based on the map information. Through this operation, as illustrated in FIG. 4, the position of the subject vehicle based on the detection result by the ambient detection sensor 110 can be located at an appropriate position on the map. In addition, as illustrated in FIG. 4, the lane boundary lines can be appropriately perceived even in a range outside the detection range of the ambient detection sensor 110.

The boundary line integration function serves to integrate a lane boundary line based on the detection result by the ambient detection sensor 110 and a lane boundary line based on the map information when the degree of coincidence between these lane boundary lines is not less than a predetermined value. The boundary line integration function can serve to determine the degree of coincidence between these lane boundary lines, for example, by an iterative closest point (ICP) scheme. The ICP refers to an algorithm employed to align a "cloud of points representing a lane boundary line detected by the ambient detection sensor 110" and a "cloud of points representing a lane boundary line possessed by the map information" on the basis of the least-square method. When a determination is made that the degree of coincidence between the lane boundary lines is not less than the predetermined value, the boundary line integration function serves to complement the lane boundary line based on the detection result by the ambient detection sensor 110 with the lane boundary line based on the map information.

On the other hand, when the degree of coincidence between the lane boundary lines is less than the predetermined value, the boundary line integration function serves to estimate the position of the subject vehicle on the map on the basis of the detection result by the ambient detection sensor 110. Then, the boundary line integration function serves to detect lane boundary lines of a lane including the position of the subject vehicle on the map from the map information and arrange the position of the subject vehicle between the lane boundary lines based on the map information. Thus, when the degree of coincidence between the lane boundary lines is less than the predetermined value, the boundary line integration function serves to set the lane boundary lines around the subject vehicle using the lane boundary lines based on the map information rather than using the lane boundary lines based on the detection results by the ambient detection sensor 110.

The control device 160 uses the surrounding vehicle detection function to detect the position and vehicle speed of a surrounding vehicle existing around the subject vehicle. Specifically, the surrounding vehicle detection function can serve to detect the position of a surrounding vehicle existing around the subject vehicle on the basis of an image captured by any of the front camera, side cameras, and rear camera which constitute the ambient detection sensor 110 or on the basis of the detection result by the laser range finder. In addition or alternatively, the surrounding vehicle detection function can serve to analyze the type of a moving object, for example, from the image information captured by the cameras thereby to identify a pedestrian, bicycle, car, or the like. In addition or alternatively, the surrounding vehicle detection function can serve to obtain the vehicle speed (absolute speed) of a surrounding vehicle on the basis of the amount of change in the relative position of the surrounding vehicle with respect to the position of the subject vehicle and the vehicle speed of the subject vehicle.

Figure 5:
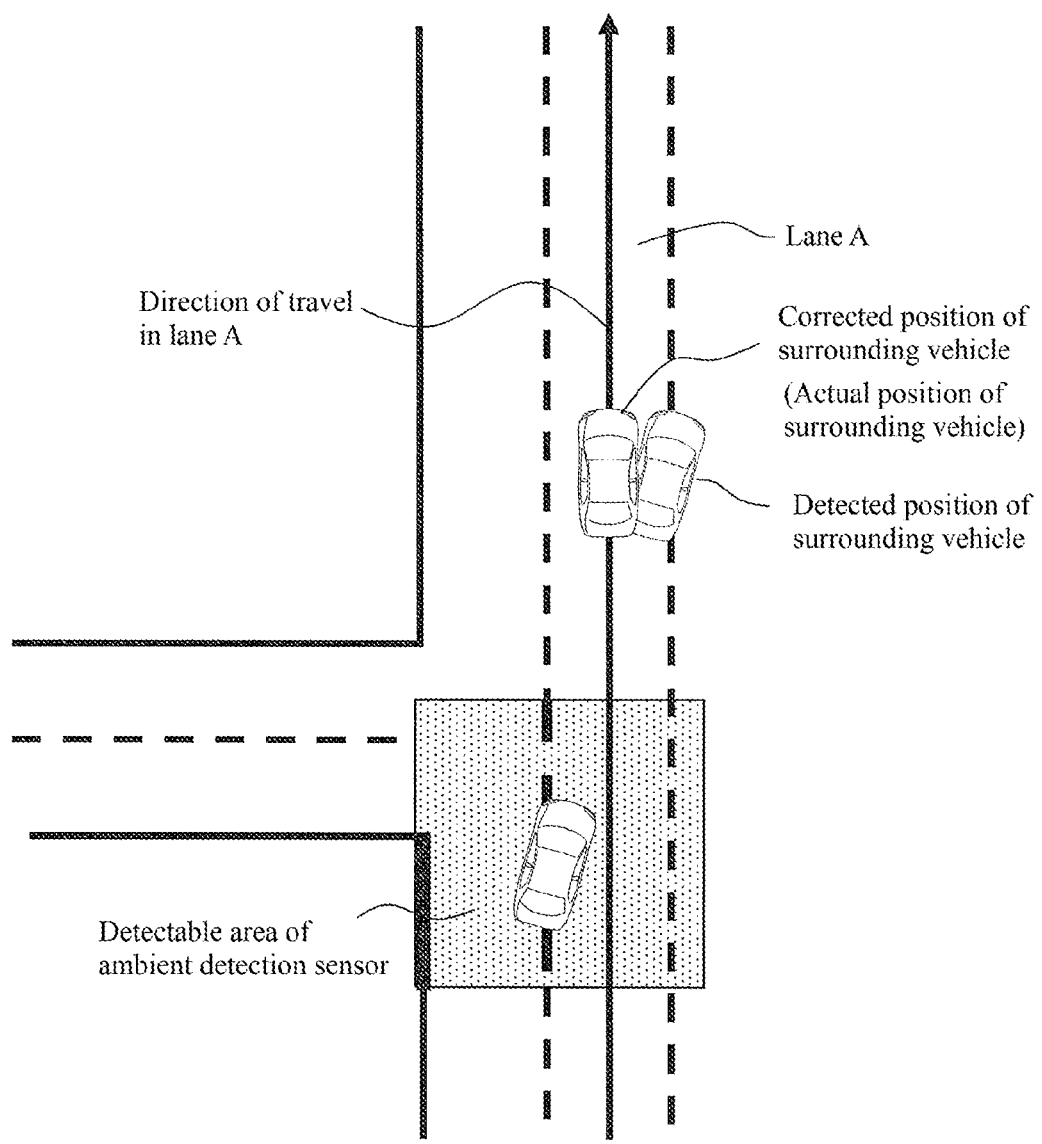
FIG. 5 is a view exemplifying a scene in which the subject vehicle is changing directions.

The control device 160 uses the travel direction determination function to determine whether or not the direction of travel in the lane in which a surrounding vehicle has traveled coincides with the traveling direction of the surrounding vehicles. In the present embodiment, the travel direction determining function serves to determine that the direction of travel in a lane coincides with the traveling direction of a surrounding vehicle when the subject vehicle is traveling straight ahead or stopped and determine that the direction of travel in the lane does not coincide with the traveling direction of the surrounding vehicle when the subject vehicle is changing directions. FIG. 5 exemplifies a scene in which the subject vehicle is changing lanes (changing directions). As illustrated in FIG. 5, when a surrounding vehicle is detected while the subject vehicle is changing directions, an error may occur in the detection result of the surrounding vehicle by the ambient detection sensor 110 as the yaw rate is generated due to the direction change of the subject vehicle. For example, as illustrated in FIG. 5, even in a case in which the surrounding vehicle is actually traveling straight ahead in a lane A, when the subject vehicle is changing lanes, the surrounding vehicle may be detected as if it travels in a direction of deviating from the lane A. When the subject vehicle is changing directions as illustrated in FIG. 5, therefore, the travel direction determination function serves to determine that the direction of travel in the lane (the direction of traveling straight ahead in FIG. 5) does not coincide with the traveling direction of the surrounding vehicle (the direction of deviating from the lane A in FIG. 5) because these directions are highly liable not to coincide with each other.

The control device 160 uses the surrounding vehicle relocation function to estimate the lane in which a surrounding vehicle is to travel, on the basis of the determination result by the travel direction determination function and arrange the position of the surrounding vehicle at a position in the estimated lane on the map. For example, when the subject vehicle is traveling straight ahead or stopped and a determination is made that the direction of travel in a lane coincides with the traveling direction of a moving object, the surrounding vehicle relocation function serves to estimate that the position of the surrounding vehicle detected by the ambient detection sensor 110 represents the lane in which the surrounding vehicle travels and arrange the position of the surrounding vehicle at the estimated position of the surrounding vehicle on the map. This is because, when the subject vehicle is traveling straight ahead or stopped, the detection error in the position of the surrounding vehicle due to generation of the yaw rate of the subject vehicle is small and the reliability of the detection result by the ambient detection sensor 110 is high.

On the other hand, when the subject vehicle is changing directions as illustrated in FIG. 5 and a determination is made that the direction of travel in a lane does not coincide with the traveling direction of a moving object, the surrounding vehicle relocation function serves to estimate a position obtained by moving the surrounding vehicle in the direction of travel in the lane in which the surrounding vehicle has traveled, as the position of the surrounding vehicle. For example, in the example illustrated in FIG. 5, the direction of travel in the lane A in which the surrounding vehicle has traveled is a direction of traveling straight ahead and, therefore, the surrounding vehicle relocation function serves to estimate a position obtained by moving the surrounding vehicle in the direction of traveling straight ahead in the lane A, as the position of the surrounding vehicle. Then, the surrounding vehicle relocation function serves to arrange the position of the surrounding vehicle at a position on the map corresponding to the estimated position of the surrounding vehicle thereby to relocate the position of the surrounding vehicle in the lane A. Through this operation, the lane in which the surrounding vehicle travels can be appropriately perceived.

Figure 6:
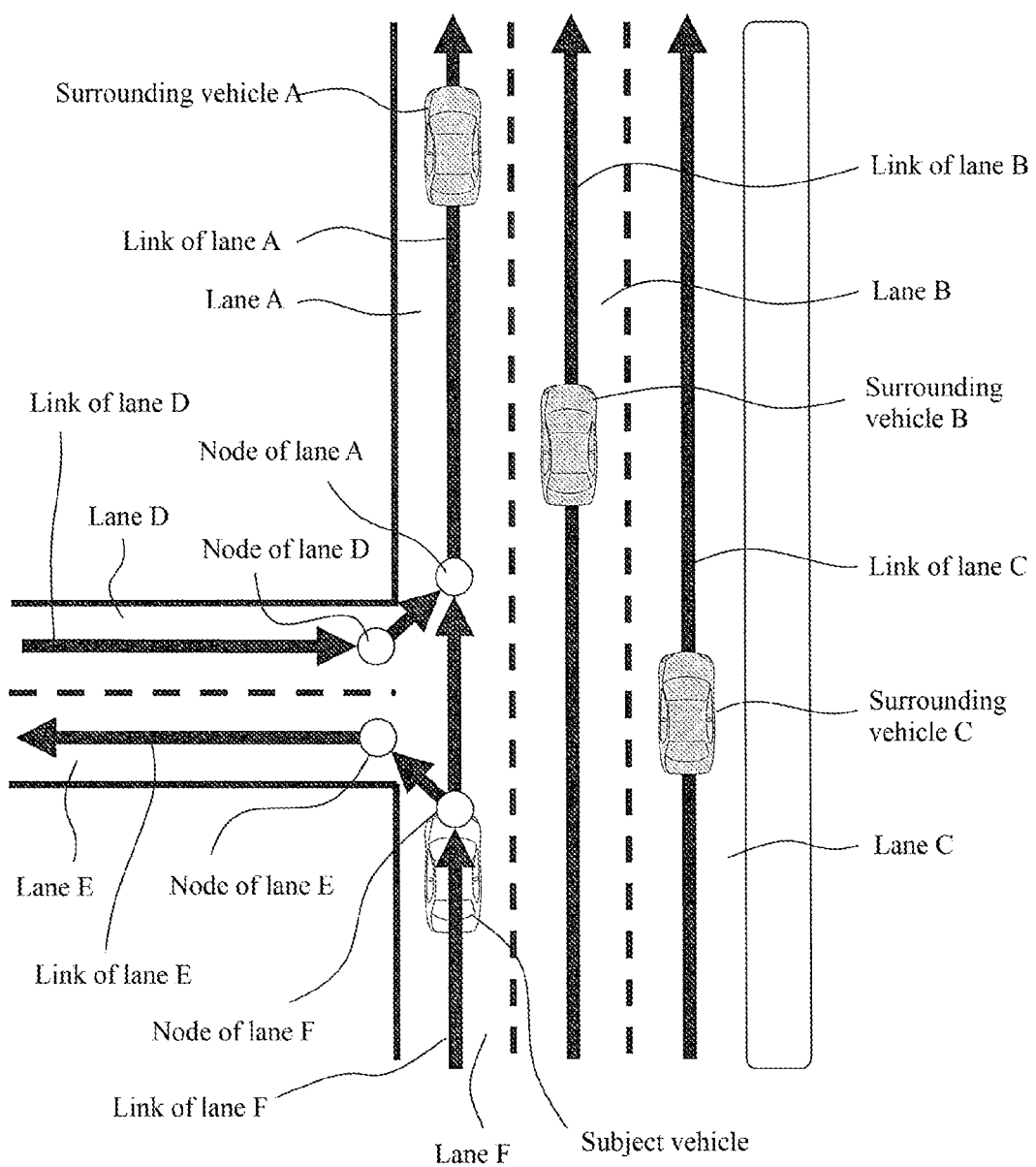
FIG. 6 is a view for describing directions of travel in the lanes in the scene illustrated in FIG. 5.

Specifically, the surrounding vehicle relocation function serves first to detect the direction of travel in a lane in which the surrounding vehicle has traveled, from the map information stored in the map database 130. In the present embodiment, as illustrated in FIG. 6, the map information includes link information corresponding to each lane. In the example illustrated in FIG. 6, links of lanes A to C in which surrounding vehicles A to C travel are all extending in the directions of traveling straight ahead. The surrounding vehicle relocation function can therefore estimate that the directions of travel in the lanes A to C are directions of traveling straight ahead. As will be understood from the figure, the link of a lane F in which the subject vehicle travels connects to the link of the lane A via a node of the lane F and a node of the lane A and also connects to the link of a lane E via the node of the lane F and a node of a lane E. In this case, the surrounding vehicle relocation function can serve to estimate the directions of travel in the lane F in which the subject vehicle travels as directions of "traveling straight ahead" and "turning left." Then, the surrounding vehicle relocation function serves to estimate the estimated direction of travel in a lane as the traveling direction of a surrounding vehicle. This is because the surrounding vehicle is highly liable to travel without changing directions in the lane in which the surrounding vehicle has traveled. Through this operation, in the example illustrated in FIG. 5, for example, the surrounding vehicle relocation function can determine that the surrounding vehicle travels in the direction of travel in the lane (direction of traveling straight ahead) in which the surrounding vehicle is traveling and arrange the position of the surrounding vehicle in the direction of traveling straight ahead in the lane A.

In addition or alternatively, the surrounding vehicle relocation function can serve to estimate the lane in which a surrounding vehicle has traveled and the moving amount of the surrounding vehicle on the basis of the history of positions of the surrounding vehicle before the subject vehicle changes directions. Then, the surrounding vehicle relocation function serves to arrange the position of the surrounding vehicle at a position obtained by moving the surrounding vehicle from the previously-estimated position of the surrounding vehicle by the moving amount of the surrounding vehicle in the direction of travel in the lane in which the surrounding vehicle has traveled. Through this operation, as illustrated in FIG. 5, the position of the surrounding vehicle (indicated by broken lines in FIG. 5) based on the detection result by the ambient detection sensor 110 can be appropriately corrected to the position (indicated by solid lines in FIG. 5) in the lane in which the surrounding vehicle is actually traveling.

Figure 7:
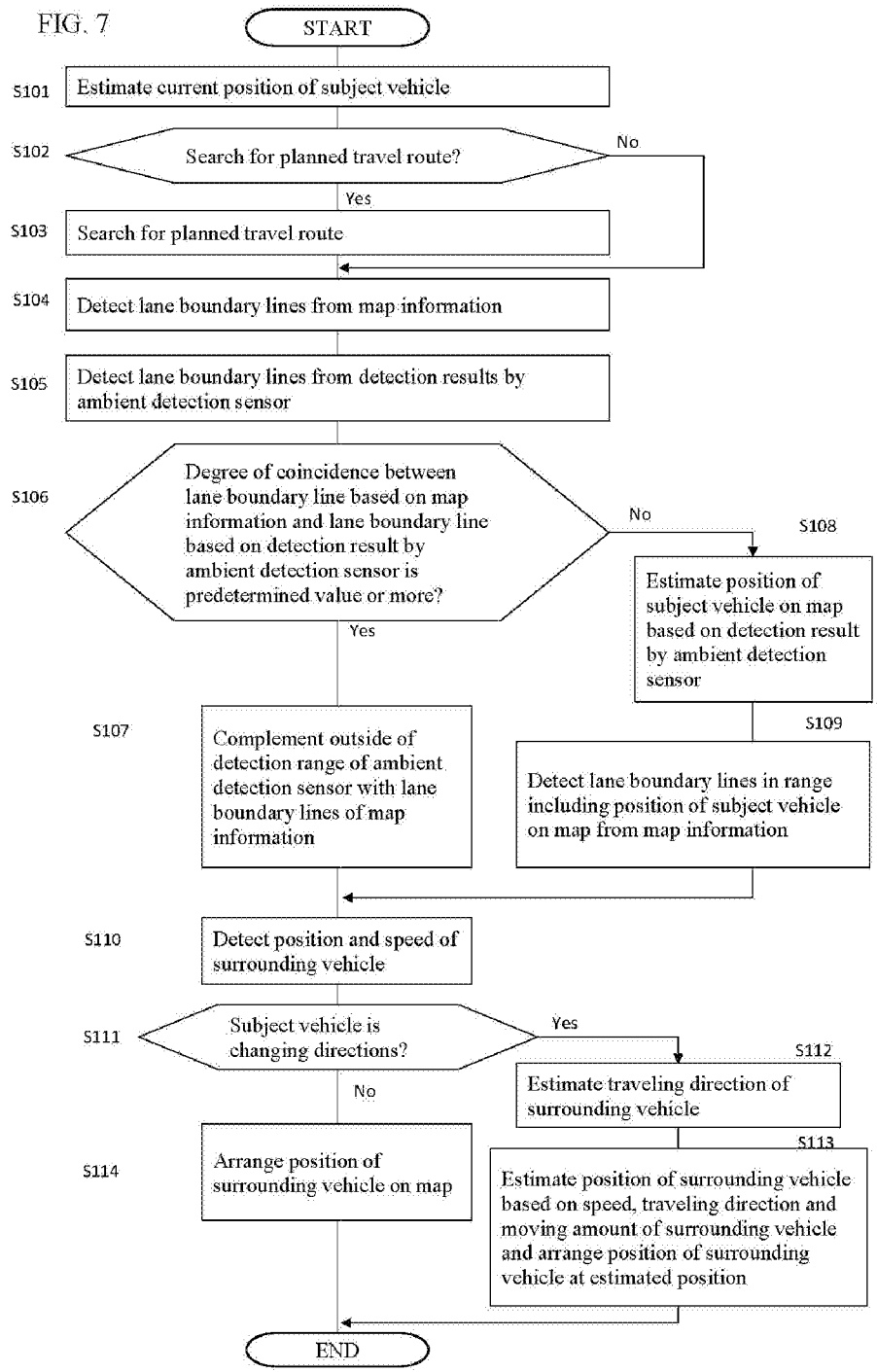
FIG. 7 is a flowchart illustrating a travel control process according to a first embodiment.

A travel control process according to the first embodiment will now be described with reference to FIG. 7. FIG. 7 is a flowchart illustrating the travel control process according to the first embodiment. The travel control process described below is executed by the control device 160.

In step S101, the route search function serves to detect the current position of the subject vehicle. In step S102, the route search function serves to determine whether or not to search for a planned travel route. For example, when the current position of the subject vehicle acquired in step S101 is not present on the planned travel route which is preliminarily set, the route search function serves to determine to search for a planned travel route, and the routine proceeds to step S103. On the other hand, when the current position of the subject vehicle is present on the planned travel route which is preliminarily set, the routine jumps to step S104 without performing the process of step S103. In addition or alternatively, when the lane in which the subject vehicle travels is specified, the route search function may serve to determine whether or not the subject vehicle is traveling in a lane that allows the subject vehicle to travel on the planned travel route. When the subject vehicle is not traveling in a lane that allows the subject vehicle to travel on the planned travel route, the route search function can serve to determine to change the planned travel route.

In step S103, the route search function serves to search for a planned travel route from the current position of the subject vehicle to the destination on the basis of the positional information of the subject vehicle acquired in step S101. The route search function may search for a planned travel route not only on the basis of the road on which the subject vehicle travels but also on the basis of the lane in which the subject vehicle travels. For example, the route search function can serve to determine the planned travel route of the subject vehicle at a lane level by a scheme using a graph search algorithm, such as Dijkstra's algorithm and A* search algorithm. In the present embodiment, the map database 130 stores the map information which includes, for example, information on links and nodes of each lane. The links are preliminarily weighted in accordance with the travel distance, road situation, etc. of each lane (for example, the weighting of links increases as the distance increases or the road situation deteriorates). The route search function further serves to specify a lane that is suitable for the travel route to the destination and correct the weighting of links of the specified lane. For example, when right turn is required to arrive at the destination, the weighting of links of the lane for right turn can be corrected to decrease. The route search function can serve to search for a planned travel route that is a route at a lane level in which the total sum of weighting of links is minimum in the lane from the current position of the subject vehicle to the destination, using a graph search algorithm such as Dijkstra's algorithm and A* search algorithm.

In step S104, the first boundary line detection function serves to perform detection of lane boundary lines based on the map information. In the present embodiment, the map information, which is stored in the map database 130, includes information on the lane boundary lines of each lane. The first boundary line detection function can therefore serve to refer to the map information stored in the map database 130 and thereby to detect the lane boundary lines of lanes including the subject vehicle lane, as illustrated in FIG. 2.

In step S105, the second boundary line detection function serves to perform detection of lane boundary lines on the basis of the detection results by the ambient detection sensor 110. As illustrated in FIG. 3, the range in which the ambient detection sensor 110 can detect the lane boundary lines is a range of a certain distance (e.g. several tens of meters) from the subject vehicle, that is, a range around the subject vehicle.

In step S106, the boundary line integration function serves to perform determination of the degree of coincidence between a lane boundary line detected in step S104 based on the map information and a lane boundary line detected in step S105 based on the detection result by the ambient detection sensor 110. When the degree of coincidence is not less than a predetermined value, the routine proceeds to step S107, while when the degree of coincidence is less than the predetermined value, the routine proceeds to step S108. For example, in the example illustrated in FIG. 3, small shifts occur between the lane boundary lines based on the map information and the lane boundary lines based on the detection results by the ambient detection sensor 110. However, a determination is made that the degree of coincidence is not less than the predetermined value, by an appropriate scheme such as an ICP scheme, and the routine proceeds to step S107.

In step S107, the boundary line integration function serves to perform a process of complementing the lane boundary lines based on the detection results by the ambient detection sensor 110 with the lane boundary lines based on the map information. Specifically, the boundary line integration function serves to complement a range outside the range in which the ambient detection sensor 110 can detect the lane boundary lines, with the lane boundary lines based on the map information. In addition or alternatively, the boundary line integration function serves to adjust the positions of the lane boundary lines based on the map information for the integration so that so that the lane boundary lines based on the detection results by the ambient detection sensor 110 coincide with the lane boundary lines based on the map information. Through this operation, as illustrated in FIG. 4, the position of the subject vehicle on the map can be appropriately detected. Moreover, as illustrated in FIG. 4, the shape of the road on which the subject vehicle is to travel from that time, the position of the subject vehicle on the planned travel route, and the like can be appropriately perceived because the lane boundary lines can be appropriately detected even in the range outside the range in which the ambient detection sensor 110 can detect the lane boundary lines.

On the other hand, when, in step S106, a determination is made that the degree of coincidence between a lane boundary line based on the map information and a lane boundary line based on the detection result by the ambient detection sensor 110 is less than the predetermined value, the routine proceeds to step S108. In step S108, the boundary line integration function serves to estimate the position of the subject vehicle on the map on the basis of the detection result by the ambient detection sensor 110. For example, the boundary line integration function can serve to estimate the current position of the subject vehicle on the basis of the planned travel route of the subject vehicle searched in step S103 and the speed of the subject vehicle.

Then, in step S109, the boundary line integration function serves to detect the lane boundary lines of a lane that includes the estimated position of the subject vehicle on the map, from the map information. Through this operation, the lane in which the subject vehicle travels and the position of the subject vehicle on the planned travel route can be appropriately perceived from the lane boundary lines of the lane which includes the position of the subject vehicle on the map.

In steps S110 to S114, a process is performed to arrange the position of a surrounding vehicle in the lane detected in step S107 or step S109. First, in step S110, the surrounding vehicle detection function serves to detect the position and vehicle speed of the surrounding vehicle. The surrounding vehicle detection function serves also to detect the moving amount of the surrounding vehicle from the time of the previous process on the basis of the position of the surrounding vehicle at the time of the previous process and the position and vehicle speed of the surrounding vehicle which are detected at the present time.

In step S111, the travel direction determination function serves to determine whether or not the subject vehicle is changing directions. When the subject vehicle is changing directions, such as when changing lanes, the travel direction determination function serves to determine that the traveling direction of a surrounding vehicle does not coincide with the direction of travel in a lane, and the routine proceeds to step S112. On the other hand, when the subject vehicle is traveling straight ahead or stopped, the travel direction determination function serves to determine that the traveling direction of a surrounding vehicle coincides with the direction of travel in a lane, and the routine proceeds to step S114. Thus, in the present embodiment, whether or not the subject vehicle is changing directions is determined thereby to make a determination whether or not the traveling direction of a surrounding vehicle conflicts with the direction of travel in a lane. When the traveling direction of a surrounding vehicle does not coincide with the direction of travel in a lane, that is, when the traveling direction of the surrounding vehicle conflicts with the direction of travel in the lane, a determination is made that an error occurs in the position of the surrounding vehicle detected by the ambient detection sensor 110, and the routine proceeds to step S112 to correct the position of the surrounding vehicle.

In step S112, the surrounding vehicle relocation function serves to estimate the traveling direction of a surrounding vehicle. For example, the surrounding vehicle relocation function serves to detect the direction of travel in a lane in which the surrounding vehicle has traveled, on the basis of the link information included in the road information and estimate the detected direction of travel in the lane as the traveling direction of the surrounding vehicle. In the example illustrated in FIG. 5, for example, the surrounding vehicle travels in the lane A and the direction of travel in the lane A is the direction of traveling straight ahead, and the surrounding vehicle relocation function can therefore serve to estimate the direction of traveling straight ahead in the lane A as the traveling direction of the surrounding vehicle.

In step S113, the surrounding vehicle relocation function serves to perform a process of arranging the position of a surrounding vehicle on the map on the basis of the traveling direction of the surrounding vehicle estimated in step S112. Specifically, the surrounding vehicle relocation function serves to estimate a position obtained by moving the surrounding vehicle in the traveling direction of the surrounding vehicle from the position of the surrounding vehicle at the time of the previous process by the moving amount from the previous process, as the position of the surrounding vehicle. Then, the surrounding vehicle relocation function serves to arrange the position of the surrounding vehicle at a position on the map corresponding to the estimated position of the surrounding vehicle.

On the other hand, when, in step S111, the surrounding vehicle relocation function serves to determine that the subject vehicle is traveling straight ahead or stopped and the direction of travel in a lane coincides with the traveling direction of a moving object, the routine proceeds to step S114. In step S114, the surrounding vehicle relocation function serves to perform a process of arranging the position of the surrounding vehicle at the position of the surrounding vehicle on the map detected in step S110. That is, the surrounding vehicle relocation function serves to estimate the position of the surrounding vehicle detected by the ambient detection sensor 110 as the position of the surrounding vehicle and arrange the position of the surrounding vehicle at a position on the map corresponding to the estimated position of the surrounding vehicle (i.e. the position of the surrounding vehicle detected by the ambient detection sensor 110).

As described above, in the first embodiment, when the subject vehicle is changing directions, a determination is made that the direction of travel in a lane in which a surrounding vehicle has traveled does not coincide with the traveling direction of the surrounding vehicle, and a position obtained by moving the surrounding vehicle in the direction of travel in the lane in which the surrounding vehicle has traveled is estimated as the position of the surrounding vehicle. Through this operation, the lane in which the surrounding vehicle actually travels can be estimated even when the direction change of the subject vehicle causes a detection error in the position of the surrounding vehicle detected by the ambient detection sensor 110 and, as illustrated in FIG. 5, the surrounding vehicle is erroneously detected in a lane different from the lane in which the surrounding vehicle has traveled.

Moreover, in the first embodiment, the moving amount of a surrounding vehicle is estimated on the basis of the history of positions of the surrounding vehicle, and a position obtained by moving the surrounding vehicle in the traveling direction of the surrounding vehicle from the previously-estimated position of the surrounding vehicle by the moving amount of the surrounding vehicle is estimated as the position of the surrounding vehicle. Through this operation, not only the position of the surrounding vehicle at a lane level but also the position of the surrounding vehicle in its traveling direction can be appropriately estimated.

Furthermore, in the first embodiment, lane boundary lines of a lane that includes the subject vehicle lane are generated on the map on the basis of the lane boundary lines based on the detection results by the ambient detection sensor 110 and the lane boundary lines based on the map information. Specifically, when the degree of coincidence between a lane boundary line around the subject vehicle based on the detection result by the ambient detection sensor 110 and a lane boundary line around the subject vehicle based on the map information is not less than a predetermined value, the lane boundary line around the subject vehicle based on the detection result by the ambient detection sensor 110 is complemented with the lane boundary line of a lane that includes the subject vehicle lane and is based on the map information. That is, a range outside the range in which the ambient detection sensor 110 can detect lane boundary lines is complemented with the lane boundary lines based on the map information because the range in which the ambient detection sensor 110 can detect lane boundary lines is smaller than the range of lane boundary lines based on the map information. Through this operation, as illustrated in FIG. 4, lane boundary lines can be appropriately detected even in the outside of the range in which the ambient detection sensor 110 can detect the lane boundary lines, and it is thus possible to appropriately perceive the shape of the road on which the subject vehicle is to travel from that time, the position of the subject vehicle on the planned travel route, and the like. Moreover, even when a detection error occurs in the position of the subject vehicle detected by the subject vehicle position detection device 120, the lane in which the subject vehicle travels can be appropriately estimated, as illustrated in FIG. 4, and the position of the subject vehicle can be arranged in an appropriate lane on the map.

In addition, in the first embodiment, when the degree of coincidence between a lane boundary line of the subject vehicle lane based on the detection result by the ambient detection sensor 110 and a lane boundary line of the subject vehicle lane based on the map information is less than a predetermined value, the position of the subject vehicle on the map is estimated on the basis of the detection result by the ambient detection sensor 110, and the lane boundary line of a lane that includes the estimated position of the subject vehicle on the map is complemented with the lane boundary line detected from the map information. Through this operation, even when the degree of coincidence between a lane boundary line of the subject vehicle lane based on the detection result by the ambient detection sensor 110 and a lane boundary line of the subject vehicle lane based on the map information is less than the predetermined value, that is, even when the lane boundary line of the subject vehicle lane based on the detection result by the ambient detection sensor 110 cannot be integrated with the lane boundary line of the subject vehicle lane based on the map information, lane boundary lines of lanes around the subject vehicle can be appropriately detected.

Second Embodiment

A travel control apparatus 100 according to a second embodiment of the present invention will then be described. The travel control apparatus 100 has the same configuration as that in the first embodiment except that it operates as follows.

The control device 160 according to the second embodiment uses the surrounding vehicle relocation function to estimate the lane in which a surrounding vehicle travels, on the basis of the direction of travel in each lane of a road on which the surrounding vehicle travels and the lighting state of a winker of the surrounding vehicle and arrange the position of the surrounding vehicle in the estimated lane.

Figure 8:
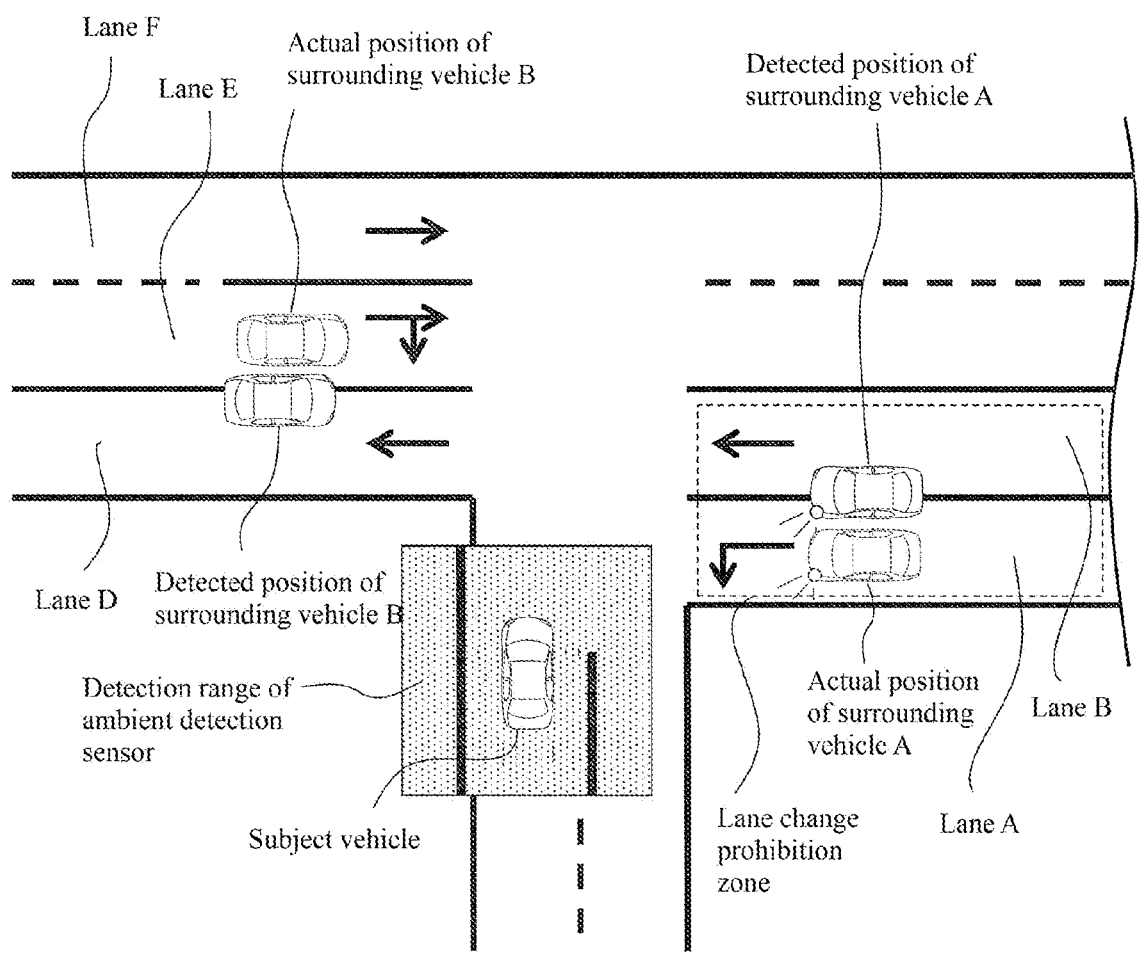
FIG. 8 is a view exemplifying a scene in which the subject vehicle enters a T-shaped intersection.

FIG. 8 is a view exemplifying a scene in which the subject vehicle enters a T-shaped intersection. In the example illustrated in FIG. 8, a surrounding vehicle A is actually traveling in a lane A, but the surrounding vehicle A is detected between the lane A and another lane B due to the detection error of the ambient detection sensor 110. In addition, another surrounding vehicle B is actually traveling in a lane E, but the surrounding vehicle B is detected in a lane D in which travel is permitted in the opposite direction to the traveling direction of the surrounding vehicle B due to the detection error of the ambient detection sensor 110.

Figure 9:
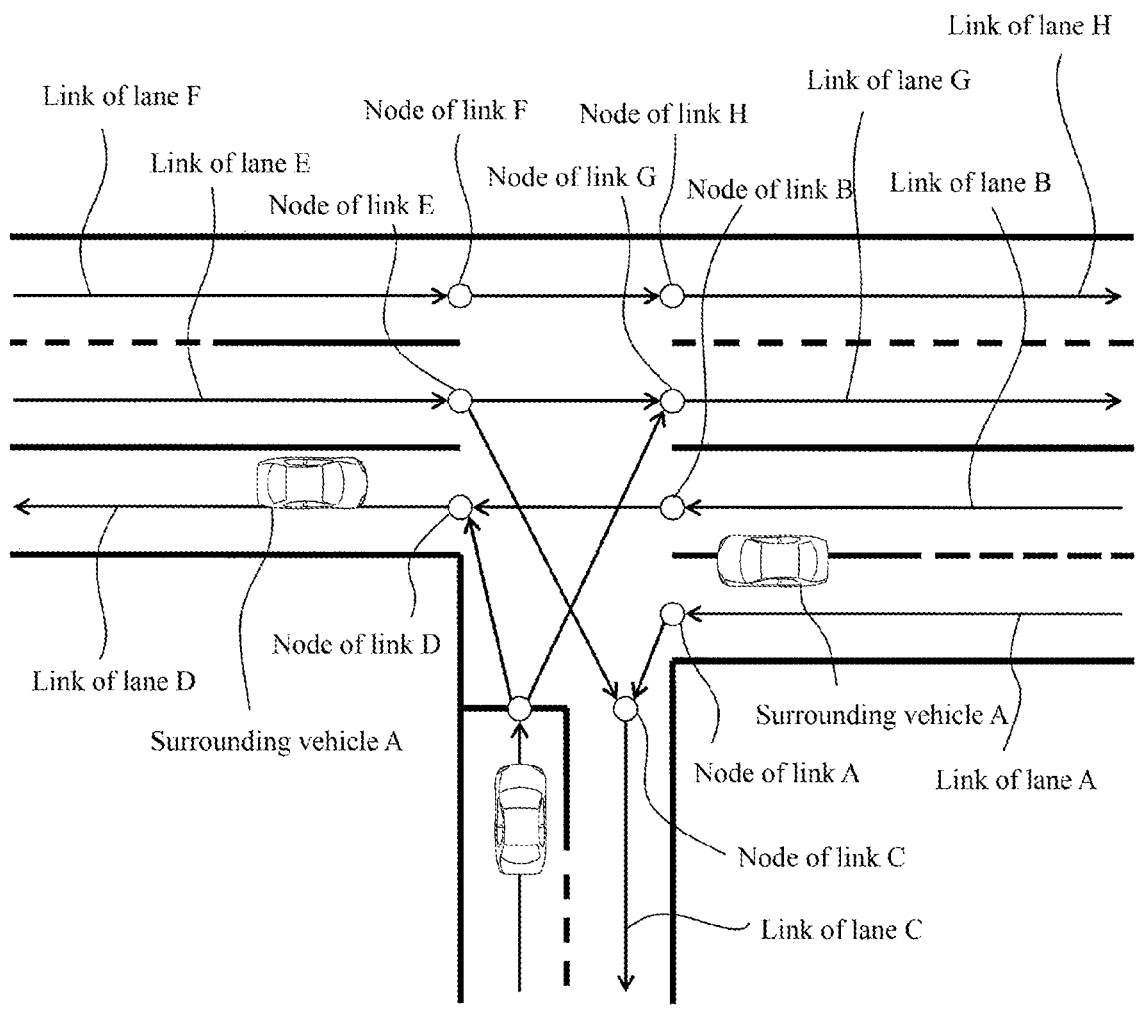
FIG. 9 is a view for describing directions of travel in the lanes in the scene illustrated in FIG. 8.

When arranging the position of the surrounding vehicle A on the map, the surrounding vehicle relocation function serves to detect the direction of travel in each lane of a road on which the surrounding vehicle A travels. Specifically, the surrounding vehicle relocation function serves to detect the direction of travel in each lane of a road on which the surrounding vehicle A travels, on the basis of the link information of each lane of the road on which the surrounding vehicle A travels. FIG. 9 is a view illustrating an example of the link and node of each lane in the scene illustrated in FIG. 8. For example, in the example illustrated in FIG. 9, the link of the lane A connects only to the link of a lane C in the left-turn direction via the node of the lane A and the node of the lane C. The surrounding vehicle relocation function can therefore serve to determine that the direction of travel in the lane A is the direction of "turning left." On the other hand, the link of the lane B connects only to the link of a lane D in the direction of traveling straight ahead via the node of the lane B and the node of the lane D. The surrounding vehicle relocation function can therefore serve to determine that the direction of travel in the lane B is the direction of "traveling straight ahead."

As illustrate in FIG. 8 and FIG. 9, the lane A is an exclusive lane for turning left while the lane B is an exclusive lane for traveling straight ahead. The surrounding vehicle relocation function can therefore serve to determine that a surrounding vehicle exists within a lane change prohibition zone, on the basis of traffic rule information that prohibits lane change between an exclusive lane for turning left or exclusive lane for turning right and an exclusive lane for traveling straight ahead near an intersection. Such traffic rule information is stored in a memory of the control device 160.

In addition or alternatively, the surrounding vehicle relocation function serves to detect the lighting state of the winker of a surrounding vehicle. For example, the surrounding vehicle relocation function can serve to detect the lighting state of the winker of a surrounding vehicle using the front camera which captures images ahead of the subject vehicle, the rear camera which captures images behind the subject vehicle, or the like. In the example illustrated in FIG. 8, for example, the surrounding vehicle relocation function can serve to detect that "the left-side winker is blinking" as the lighting state of the winker of the surrounding vehicle A.

Then, the surrounding vehicle relocation function serves to arrange the position of a surrounding vehicle in an appropriate lane on the basis of the direction of travel in each lane of the road on which the surrounding vehicle travels and the lighting state of the winker of the surrounding vehicle. In the example illustrated in FIG. 8, for example, the direction of travel in the lane B is the direction of "traveling straight ahead" while the direction of travel in the lane A is the direction of "turning left," and the left-side winker of the surrounding vehicle A is blinking. The surrounding vehicle relocation function can therefore determine that the lane in which the surrounding vehicle A travels is the lane A which is an exclusive lane for turning left. Accordingly, the surrounding vehicle relocation function serves to estimate that the lane in which the surrounding vehicle A travels is the lane A and arrange the position of the surrounding vehicle A in the lane A on the map.

In an alternative configuration, when the surrounding vehicle A travels in a lane change prohibition zone as illustrated in FIG. 8, the surrounding vehicle relocation function may serve to arrange the position of the surrounding vehicle in the lane A in which the position of the surrounding vehicle A is arranged at the time of the previous process, without estimating the lane in which the surrounding vehicle A travels. In the example illustrated in FIG. 8, for example, when the surrounding vehicle A is traveling in the lane change prohibition zone, after once arranging the position of the surrounding vehicle A in the lane A, the surrounding vehicle relocation function can serve to arrange the position of the surrounding vehicle A in the lane A while the surrounding vehicle A is traveling in the lane change prohibition zone.

A method of arranging the position of the surrounding vehicle B will then be described. In the example illustrated in FIG. 8, the surrounding vehicle B is detected in the lane D which permits travel in the opposite direction to the traveling direction of the surrounding vehicle B. On the other hand, in addition to the lane D, lanes E and F exist on the road on which the surrounding vehicle B travels. As illustrated in FIG. 9, the link of the lane E connects to the link of a lane G in the direction of traveling straight ahead via the node of the lane E and the node of the lane G and connects also to the link of the lane C in the direction of turning right via the node of the lane E and the node of the lane C. The surrounding vehicle relocation function can therefore serve to determine that the direction of travel in the lane E is the direction of "traveling straight ahead" or "turning right." The link of the lane F connects only to the link of a lane H in the direction of traveling straight ahead via the node of the lane F and the node of the lane H. The surrounding vehicle relocation function can therefore serve to determine that the direction of travel in the lane F is the direction of "traveling straight ahead."

In addition or alternatively, in the example illustrated in FIG. 8, the surrounding vehicle relocation function serves to detect "unlit" as the lighting state of the winker of the surrounding vehicle B. Then, on the basis of the detection results of the directions of travel in the lanes E and F, the surrounding vehicle relocation function serves to estimate that the possibility of wrong-way traveling of the surrounding vehicle B in the lane D is low and the surrounding vehicle B travels in the lane E or F and arrange the position of the surrounding vehicle B in the lane E or F on the map.

Figure 10:
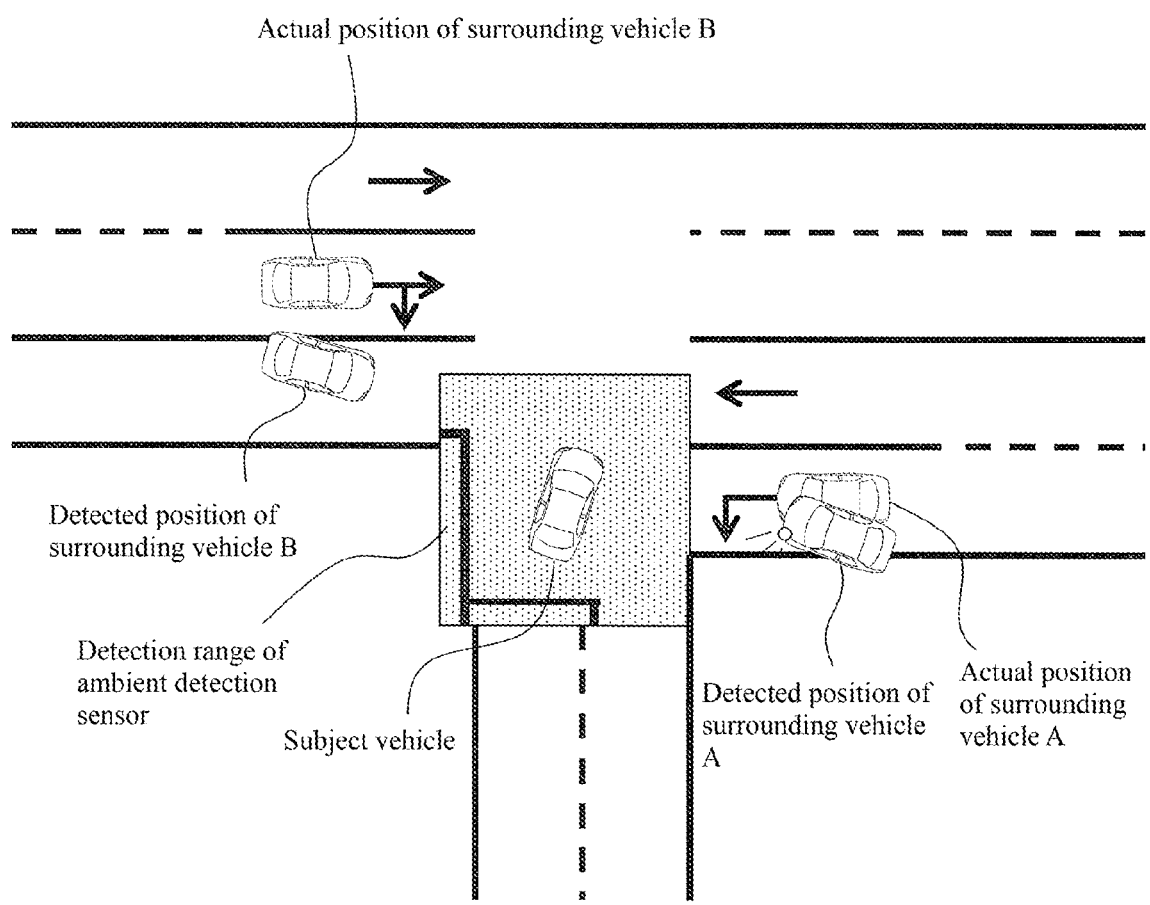
FIG. 10 is a view exemplifying a scene in which the subject vehicle is changing directions in the scene illustrated in FIG. 8.

FIG. 10 exemplifies a scene in which the subject vehicle turns right (changes directions) in the T-shaped intersection in the scene illustrated in FIG. 9. As illustrated in FIG. 10, when the subject vehicle is changing directions, the attitude angle of the subject vehicle varies to generate a yaw rate. This may deteriorate the reliability of detection results of the position and speed of a surrounding vehicle by the ambient detection sensor 110, and the position of a surrounding vehicle may be detected at a position different from the actual position of the surrounding vehicle. According to the second embodiment, even in such a case, the surrounding vehicle relocation function can serve to estimate the lane in which a surrounding vehicle travels and arrange the position of the surrounding vehicle in the estimated lane, on the basis of the direction of travel in each lane of the road on which the surrounding vehicle travels and the lighting state of the winker of the surrounding vehicle. Through this operation, in the example illustrated in FIG. 10, the surrounding vehicle relocation function can serve to arrange the position of the surrounding vehicle A in the lane A and arrange the position of the surrounding vehicle B in the lane E.

A travel control process according to the second embodiment will then be described with reference to FIG. 11. FIG. 11 is a flowchart illustrating the travel control process according to the second embodiment. Steps S101 to S110 in the second embodiment are the same as those in the first embodiment, and the description thereof will be omitted.

That is, step S201 follows step S110 in which the position and speed of a surrounding vehicle are detected. In step S201, the travel direction determination function serves to determine whether or not the subject vehicle is traveling straight ahead or changing directions. When the subject vehicle is stopped, the reliability of detection results of the position and speed of a surrounding vehicle is high, so the routine proceeds to step S113 in which a process is performed such that the position of the surrounding vehicle is arranged at a position on the map corresponding the detected position of the surrounding vehicle. When the subject vehicle is traveling straight ahead or changing directions, the reliability of detection results of the position and speed of a surrounding vehicle is low, so the routine proceeds to step S202 to appropriately estimate the lane in which the surrounding vehicle travels.

In step S202, the surrounding vehicle relocation function serves to detect the direction of travel in each lane of the road on which a surrounding vehicle travels. For example, the surrounding vehicle relocation function can serve to acquire information on the link and node of each lane of the road on which a surrounding vehicle travels, as illustrated in FIG. 9, from the map database 130 and detect the direction of travel in each lane on the basis of the acquired information on the links and nodes. The surrounding vehicle relocation function serves also to determine whether or not a surrounding vehicle is traveling in a lane change prohibition zone from the information on the direction of travel in each lane.

In step S203, the surrounding vehicle relocation function serves to detect the lighting state of the winker of a surrounding vehicle. The surrounding vehicle relocation function can detect the lighting state of the winker of a surrounding vehicle, for example, using the front camera which captures images ahead of the subject vehicle.

In step S204, the surrounding vehicle relocation function serves to estimate the position of a surrounding vehicle on the basis of the direction of travel in each lane of the road on which the surrounding vehicle travels and the lighting state of the winker of the surrounding vehicle. Then, in step S205, the surrounding vehicle relocation function serves to arrange the position of the surrounding vehicle at a position on the map corresponding to the position of the surrounding vehicle which is estimated in step S205.

In the example illustrated in FIG. 8, for example, the subject vehicle is traveling straight ahead to enter the intersection (step S201=Yes). In this case, the surrounding vehicle relocation function serves to detect the directions of travel in the lanes A and B of the road on which the surrounding vehicle A travels as directions of turning left and traveling straight ahead, respectively, and detect that the surrounding vehicle A exists in a lane change prohibition zone (step S202). The surrounding vehicle relocation function serves also to detect that the surrounding vehicle A is blinking the left-side winker (step S203). Through this operation, the surrounding vehicle relocation function serves to estimate that the surrounding vehicle A exists in the lane A which is a exclusive lane for turning left (step S204) and arrange the position of the surrounding vehicle A in the lane A on the map (step S205).

In addition, the surrounding vehicle relocation function serves to detect the directions of travel in the lanes E and F of the road on which the surrounding vehicle B travels as directions of "traveling straight ahead or turning right" and "traveling straight ahead," respectively (step S202). The surrounding vehicle relocation function serves also to detect that the surrounding vehicle B is not blinking the winker (step S203). The surrounding vehicle relocation function serves further to determine that the possibility of wrong-way traveling of the surrounding vehicle B in the lane D is low and estimate that the surrounding vehicle B is travelling in the lane E or F which permits to travel straight ahead (step S204). The surrounding vehicle relocation function therefore serves to arrange the position of the surrounding vehicle B in the lane E or F (step S205). In this operation, as illustrated in FIG. 8, the surrounding vehicle relocation function can serve to arrange the position of the surrounding vehicle B in a lane of the lanes E and F that is nearer to the position at which the surrounding vehicle B is detected by the ambient detection sensor 110.

As described above, in the second embodiment, the lane in which a surrounding vehicle travels is estimated on the basis of the lighting state of the winker of the surrounding vehicle and the direction of travel in each lane of the road on which the surrounding vehicle travels, and the position of the surrounding vehicle is arranged at a position on the map corresponding to the estimated lane. Through this operation, in the second embodiment, the lane in which the surrounding vehicle travels can be more appropriately estimated with consideration for the direction of travel in each lane of the road on which the surrounding vehicle travels, and the position of the surrounding vehicle can be arranged at an appropriate position on the map.

Moreover, in the second embodiment, a determination is made as to whether or not a surrounding vehicle is traveling in a lane change prohibition zone, on the basis of the direction of travel in each lane of the road on which the surrounding vehicle travels, and when the surrounding vehicle is traveling in a lane change prohibition zone, the position of the surrounding vehicle is estimated in the same lane. Through this operation, the lane in which the surrounding vehicle travels can be appropriately estimated in accordance with the traffic rule applied to the lane change prohibition zone, and the position of the surrounding vehicle can be arranged at an appropriate position on the map.

Furthermore, in the second embodiment, when the subject vehicle is changing directions or traveling straight ahead, a determination is made that the traveling direction of a surrounding vehicle does not coincide with the direction of travel in a lane, and the position of arranging the surrounding vehicle is corrected. This allows the position of the surrounding vehicle to be arranged at an appropriate position even in a scene in which the detection accuracy of the position and speed of the surrounding vehicle deteriorates because the subject vehicle is traveling.

Third Embodiment

A travel control apparatus 100 according to a third embodiment of the present invention will then be described. The travel control apparatus 100 has the same configuration as that in the first embodiment except that it operates as follows.

In the third embodiment, the control device 160 uses the surrounding vehicle relocation function to determine the positions of the subject vehicle and surrounding vehicle on the map on the basis of road indicators and road shapes (including road curves). The road indicators refer to those, such as stop lines, traffic signs, traffic lights and fire hydrants, which are fixed on a road surface or in the vicinity of the road surface and can be indicators. The road shape refers to the shape of a road, such as a curve.

The surrounding vehicle relocation function serves to detect road indicators and road shapes on the basis of the detection results by the camera or laser range finder which constitutes the ambient detection sensor 110. The surrounding vehicle relocation function also serves to detect road indicators and road shapes from the map information. In the present embodiment, the map information stored in the map database 130 includes information on the positions of road indicators and the road shapes. Information on road indicators includes the width of a stop line, the shape and height of a road sign, and the shape, size and height of a traffic light and a fire hydrant. The map database 130 stores the road shape of each lane as a sequence of points or a polynomial function. The map database 130 also stores the type (such as solid line, double line, and broken line) and color (such as white and yellow) of lane marks that define each lane. Thus, the surrounding vehicle relocation function can serve to refer to the map information stored in the map database 130 and thereby to detect the road indicators and road shapes around the subject vehicle.

Figure 12A:
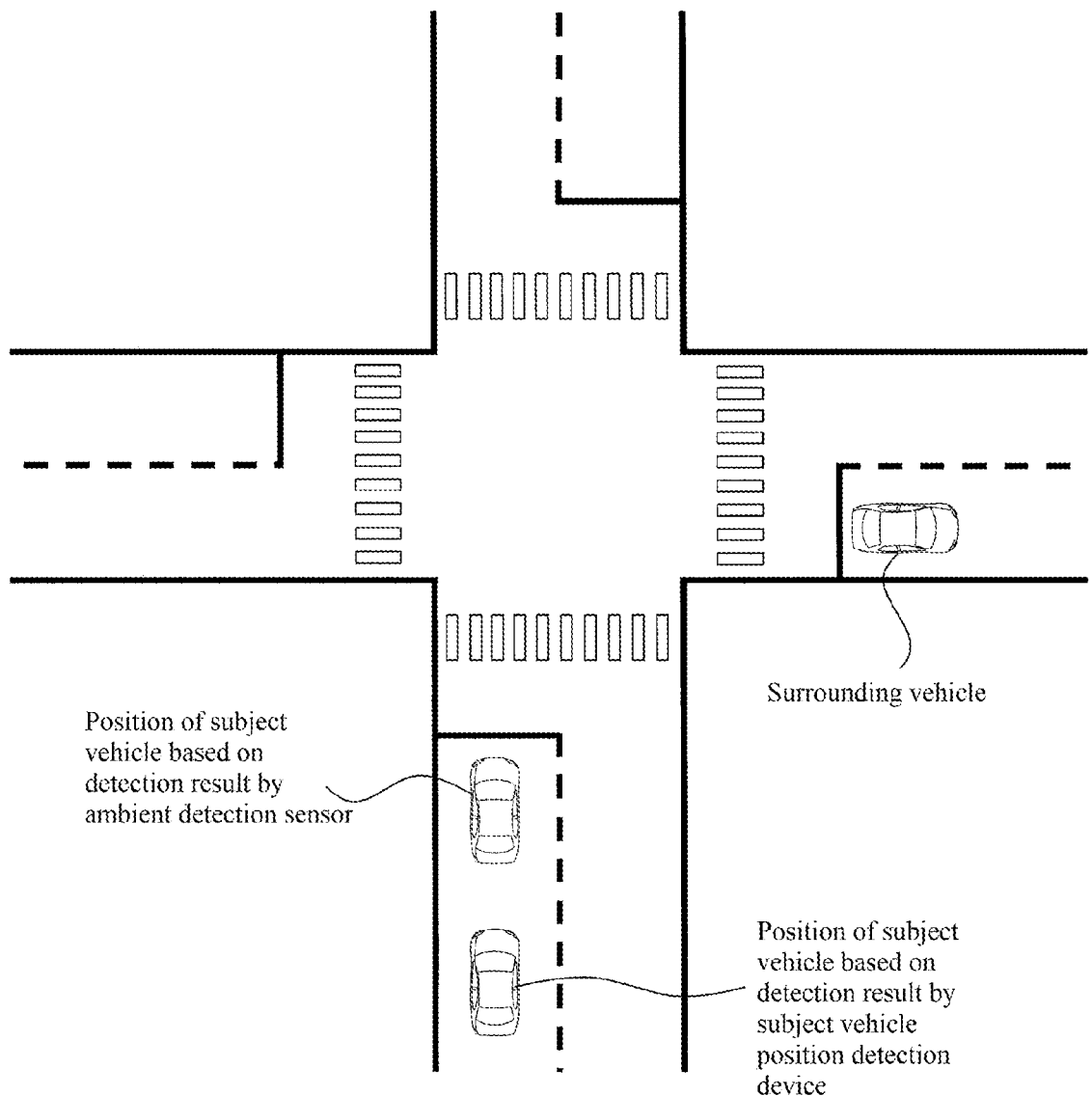
FIG. 12A is a view exemplifying a scene in which the subject vehicle enters a cross-shaped intersection.
Figure 12B:
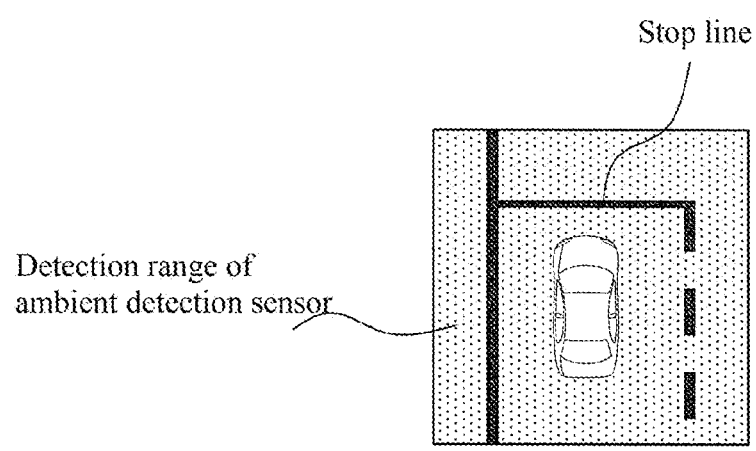
FIG. 12B is a view illustrating an example of the detection result by an ambient detection sensor in the scene illustrated in FIG. 12A.

FIG. 12A exemplifies a scene in which the subject vehicle enters a cross-like intersection. In the example illustrated in FIG. 12A, the position of the subject vehicle is detected at a position separate from a stop line of the intersection to some extent on the basis of the measurement result by the subject vehicle position detection device 120. FIG. 12B is a view illustrating an example of the detection result by the ambient detection sensor 110 in the scene illustrated in FIG. 12A. As illustrated in FIG. 12B, the stop line of the intersection is detected just ahead of the subject vehicle in accordance with the detection result by the ambient detection sensor 110. That is, in the example illustrated in FIG. 12A, the position of the subject vehicle detected by the subject vehicle position detection device 120 is a position different from the position of the subject vehicle based on the detection result by the ambient detection sensor 110 due to the detection error of the subject vehicle position detection device 120.

Figure 13:
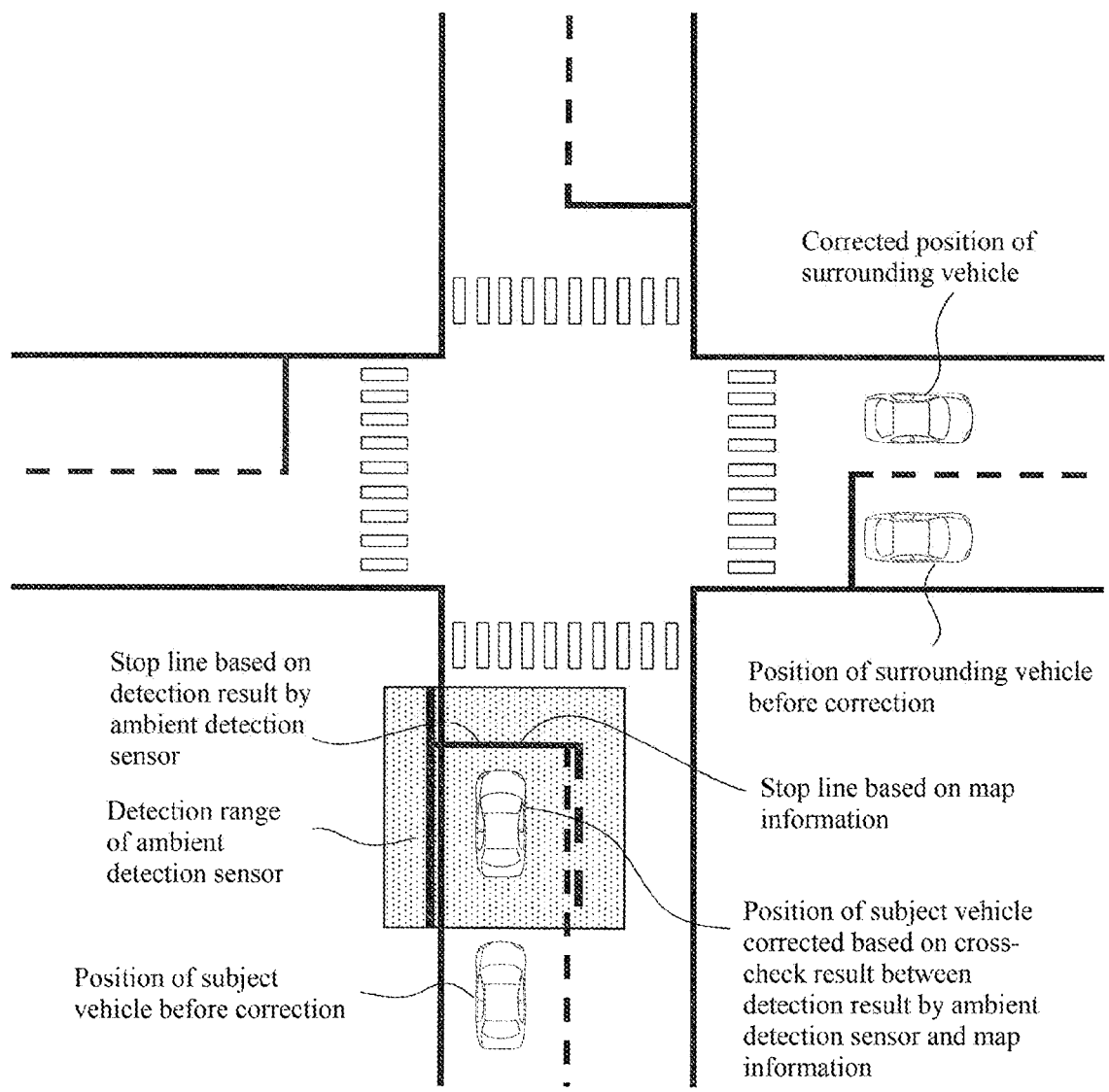
FIG. 13 is a view for describing a method of correcting positions of the subject vehicle and a surrounding vehicle in the scene illustrated in FIG. 12A.

In this case, the surrounding vehicle relocation function serves to perform matching between the stop line detected by the ambient detection sensor 110 and the stop line detected based on the map information, as illustrated in FIG. 13, thereby to correct the position of the subject vehicle in the traveling direction of the subject vehicle. Through this operation, even when a detection error occurs in the subject vehicle position detection device 120, the position of the subject vehicle can be appropriately estimated and the position of the subject vehicle can be arranged at an appropriate position on the map.

The surrounding vehicle relocation function serves also to correct the position of a surrounding vehicle in accordance with the correction of the position of the subject vehicle. This will be more specifically described. When an error occurs in the position of the subject vehicle, as illustrated in FIG. 12A, an error also occurs in the position of a surrounding vehicle detected with reference to the position of the subject vehicle. Accordingly, when correcting the position of the subject vehicle on the map, the surrounding vehicle relocation function serves also to move the position of the surrounding vehicle on the map in the same direction as that of the subject vehicle by the same moving amount as that of the subject vehicle. Through this operation, as illustrated in FIG. 13, the lane in which the surrounding vehicle travels can be appropriately estimated and the position of the surrounding vehicle can be arranged in an appropriate lane on the map.

Figure 14:
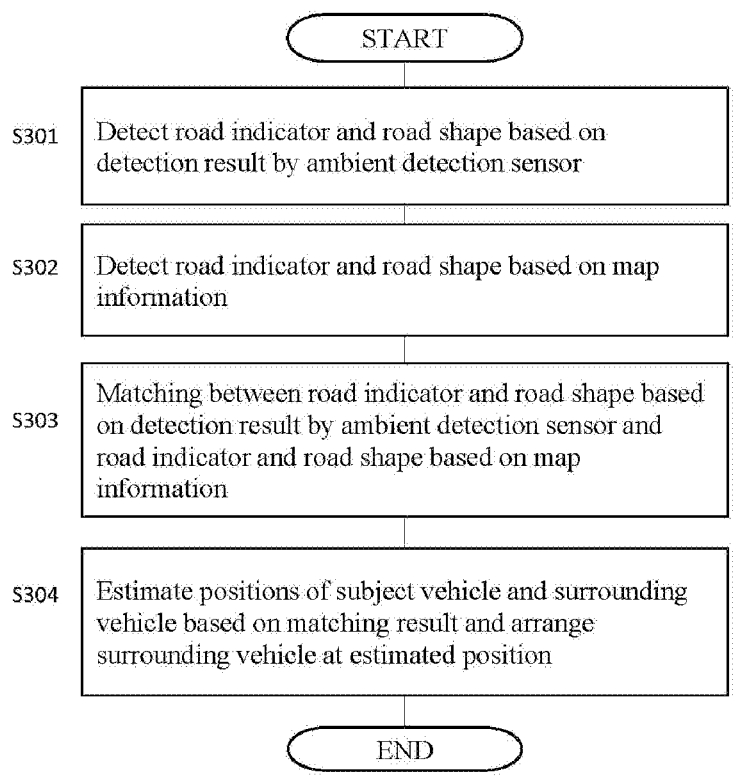
FIG. 14 is a flowchart illustrating a travel control process according to a third embodiment.

A travel control process according to the third embodiment will then be described with reference to FIG. 14. FIG. 14 is a view for describing the travel control process according to the third embodiment. The travel control process illustrated in FIG. 14 is executed to follow the travel control process of the first embodiment illustrated in FIG. 7. That is, after the process of step S113 or S114 illustrated in FIG. 7 is performed, the process of step S301 illustrated in FIG. 14 is performed.

In step S301, the surrounding vehicle relocation function serves to detect road indicators and road shapes around the subject vehicle on the basis of the detection results by the ambient detection sensor 110. In step S302, the surrounding vehicle relocation function serves to detect road indicators and road shapes around the subject vehicle on the basis of the map information.

In step S303, the surrounding vehicle relocation function serves to perform matching between the road indicators and road shapes detected in step S301 based on the detection results by the ambient detection sensor 110 and the road indicators and road shapes detected in step S302 based on the map information. For example, using a scheme of pattern matching, the surrounding vehicle relocation function can serve to perform matching between the road indicators based on the detection results by the ambient detection sensor 110 and the road indicators based on the map information. In addition, using a scheme of ICP, the surrounding vehicle relocation function can serve to perform matching between the road shapes based on the detection results by the ambient detection sensor 110 and the road shapes based on the map information.

In step S304, the surrounding vehicle relocation function serves to correct the positions of the subject vehicle and surrounding vehicle on the basis of the matching results of step S303. For example, as illustrated in FIG. 13, the positions of the subject vehicle and surrounding vehicle on the map are corrected so that the stop line detected by the ambient detection sensor 110 coincides with the stop line detected from the map information, and the positions of the subject vehicle and surrounding vehicle can thereby be appropriately estimated. In a road shape such as an intersection and curve, the positions of the subject vehicle and surrounding vehicle are corrected so that the road shape based on the detection result by the ambient detection sensor 110 coincides with the road shape based on the map information, and the positions of the subject vehicle and surrounding vehicle can thereby be appropriately estimated. Then, the surrounding vehicle relocation function serves to arrange the positions of the subject vehicle and surrounding vehicle on the map on the basis of the corrected positions of the subject vehicle and surrounding vehicle. This allows the positions of the subject vehicle and surrounding vehicle to be arranged at appropriate positions on the map.

If, in step S304, the positions of the subject vehicle and surrounding vehicle are suddenly changed on the map, uncomfortable feeling may be given to the driver. To overcome this issue, moving amounts (correction amounts) of the positions of the subject vehicle and surrounding vehicle may be processed using a certain filter thereby to alleviate the change in the positions of the subject vehicle and surrounding vehicle, and the uncomfortable feeling given to the driver can thus be mitigated.

As described above, in the third embodiment, the positions of the subject vehicle and surrounding vehicle are corrected on the map so that the road indicators and road shapes detected by the ambient detection sensor 110 coincide with the road indicators and road shapes detected from the map information. The lanes in which the subject vehicle and the surrounding vehicle travel can thereby be appropriately estimated, and the positions of the subject vehicle and surrounding vehicle can be arranged at appropriate positions on the map.

Moreover, in the third embodiment, the position of a surrounding vehicle is moved in the direction, in which the position of the subject vehicle is corrected, by the moving amount and thereby the position of the surrounding vehicle can also be appropriately corrected. When an error occurs in the position of the subject vehicle, an error also occurs in the position of a surrounding vehicle because the position of the surrounding vehicle is determined on the basis of the position of the subject vehicle. The position of the surrounding vehicle is therefore corrected by the correction amount of the position of the subject vehicle. The lane in which the surrounding vehicle travels can thereby be appropriately estimated and the position of the surrounding vehicle can be arranged at an appropriate position on the map.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described one or more embodiments of the present invention, a configuration is exemplified in which the lane for a surrounding vehicle to actually travel is estimated on the basis of the direction of travel in a lane of the road on which the surrounding vehicle travels and the position of the surrounding vehicle is arranged in an appropriate lane on the map, but the present invention is not limited to this configuration and another configuration may also be employed in which, for example, the lane for a surrounding vehicle to actually travel is estimated on the basis of the direction of travel in a lane of the road on which the surrounding vehicle travels and travel of the subject vehicle is automatically controlled on the basis of the estimation result.

In the above-described first embodiment, a configuration is exemplified in which a position obtained by moving a surrounding vehicle in the direction of travel in the lane in which the surrounding vehicle has traveled is estimated as the position of the surrounding vehicle, but the present invention is not limited to this configuration and another configuration may also be employed in which, for example, the traveling direction of a surrounding vehicle is estimated on the basis of the history of positions of the surrounding vehicle and a position obtained by moving the surrounding vehicle in the estimated traveling direction as the position of the surrounding vehicle. Also in this case, even when an error occurs in the detected position of the surrounding vehicle by the ambient detection sensor 110, the lane in which the surrounding vehicle travels can be appropriately estimated and the position of the surrounding vehicle can be arranged at an appropriate position on the map.

In the above-described first embodiment, a configuration is exemplified in which, when the subject vehicle is changing directions, a determination is made that the traveling direction of a surrounding vehicle does not coincide with the direction of travel in the lane in which the surrounding vehicle has traveled, and the position of the surrounding vehicle is corrected, but the present invention is not limited to this configuration and another configuration may also be employed in which, also when the subject vehicle is traveling straight ahead, a determination is made that the traveling direction of a surrounding vehicle does not coincide with the direction of travel in the lane in which the surrounding vehicle has traveled, and the position of the surrounding vehicle is corrected.

In addition to the above-described one or more embodiments of the present invention, a configuration can be employed in which, provided that a surrounding vehicle exists in the lane for the subject vehicle to travel, even when the subject vehicle is changing directions, the position of the surrounding vehicle is arranged at a position detected by the ambient detection sensor 110. Also in this case, the detection error due to a yaw rate is less likely to occur, and the position of the surrounding vehicle can be arranged at an appropriate position.

The ambient detection sensor 110 in the above-described embodiments corresponds to the detector of the present invention.

REFERENCE SIGNS LIST

100 Travel control apparatus
110 Ambient detection sensor
120 Subject vehicle position detection device
130 Map database
140 Presentation device
150 Drive control device
160 Control device

The invention claimed is:

1. A method of estimating a position of a moving object near a subject vehicle, comprising:
   detecting, by a first sensor provided in the subject vehicle, a current position of the subject vehicle;
   detecting, by a second sensor provided in the subject vehicle, a relative position of the moving object with respect to the current position of the subject vehicle;
   detecting, using map information, a direction of travel of the moving object in a lane wherein the lane is located on a road on which the moving object travels; and
   determining whether or not the subject vehicle is changing directions;
   wherein when the subject vehicle is determined to be changing directions, correcting the relative position of the moving object on the map information to a corrected relative position of the moving object based on the direction of travel of the moving object in the lane; and
   wherein when the subject vehicle is determined to be not changing directions, determining the relative position of the moving object on the map information without correcting based on the direction of travel of the moving object in the lane.

2. The method according to claim 1, further comprising:
   wherein when the subject vehicle is determined to be changing directions, determining a moving amount of the moving object based on historical positional information of the moving object; and
   wherein the step of correcting the relative position of the moving object on the map information to the corrected relative position of the moving object includes correcting the relative position of the moving object by the moving amount in the direction of travel in the lane in which the moving object has traveled.

3. The method according to claim 1, further comprising:

wherein when the subject vehicle is determined to be changing directions, determining a moving direction of the moving object based on historical positional information of the moving object; and wherein the step of correcting the relative position of the moving object on the map information to the corrected relative position of the moving object includes correcting the relative position of the moving object based on the moving direction of the moving object.

4. A travel control apparatus comprising:

a first sensor provided in a subject vehicle that is intended to detect a current position of the subject vehicle;

a second sensor provide in the subject vehicle that is intended to detect a relative position of a moving object relative to the current position of the subject vehicle; and a controller configured to:
  determine, using map information, a direction of travel of the moving object in a lane, wherein the lane is located on a road on which the moving object travels; and
  determine whether or not the subject vehicle is changing directions;
  wherein when the subject vehicle is determined to be changing directions, correcting the relative position of the moving object on the map information to a corrected relative position of the moving object based on the direction of travel of the moving object in the lane; and
wherein when the subject vehicle is determined to be not changing directions, determining the relative position of the moving object on the map information without correcting based on the direction of travel of the moving object in the lane.

* * * * *